United States Patent
Steer et al.

(10) Patent No.: US 6,633,564 B1
(45) Date of Patent: Oct. 14, 2003

(54) METHOD AND APPARATUS FOR INSERTING PACKETS INTO A DATA STREAM

(75) Inventors: David G. Steer, Nepean (CA); Paul M. Row, Herts (GB)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/401,856

(22) Filed: Sep. 22, 1999

(51) Int. Cl.[7] .............................................. H04L 12/56
(52) U.S. Cl. ............... 370/389; 370/395.4; 370/395.64; 370/395.1; 709/238; 707/240
(58) Field of Search ............................ 370/230, 231, 370/235, 300, 389, 392, 395.1, 395.4, 395.42, 395.43, 395.52, 352, 469, 470, 471, 474, 473, 395.6, 395.64; 709/238; 707/240

(56) References Cited

U.S. PATENT DOCUMENTS

| | | | |
|---|---|---|---|
| 4,542,380 A | * 9/1985 | Beckner et al. | 340/825.5 |
| 4,642,630 A | * 2/1987 | Beckner et al. | 340/825.5 |
| 4,777,595 A | * 10/1988 | Strecker et al. | 370/474 |
| 5,343,473 A | * 8/1994 | Cidon et al. | 340/825.51 |
| 5,557,608 A | * 9/1996 | Calvignac et al. | 370/389 |
| 6,292,484 B1 | * 9/2001 | Oliver | 370/389 |

* cited by examiner

Primary Examiner—Alpus H. Hsu
Assistant Examiner—Michael J Molinari

(57) ABSTRACT

This invention provides a communication network with a method and apparatus for interrupting the transmission of an existing stream of data to insert interrupting packets which may have a higher priority than the existing data stream. The interrupting packets are inserted in the data stream by making use of unused pointer values in common transmission schemes known as the Data Over Cable Service Interchange Specification (DOCSIS) or the Asynchronous Transfer Mode (ATM) adaptation layer 2 (AAL2) format of the International Telecommunications Union (ITU) recommendation I363.2. Advantageously, the scheduling of packets is significantly simplified and the packet jitter is better controlled which results in a significant improvement in transmission performance.

42 Claims, 13 Drawing Sheets

METHOD AND APPARATUS FOR INSERTING PACKETS INTO A DATA STREAM

FIELD OF THE INVENTION

This invention relates generally to the transmission of data in telecommunications networks and more particularly to the insertion of packets into an existing stream of data.

BACKGROUND ART

In the vast majority of conventional communication networks, data is often arranged into packets so that it can be manipulated more easily. Packets are typically provided with sufficient identification information to be handled independently from one another. This identification information is usually contained in a header which is appended to each packet. With this information, packets generated by different users can be transmitted in any order and reassembled at the intended destination. This flexibility allows schedulers used in today's networks to interleave packets and concurrently service transmission requests from different users.

For the transmission of data packets in a communication network, it is often convenient to subdivide each packet into smaller "chunks" known as physical layer blocks. By subdividing each data packet into smaller physical layer blocks, the data packets can be more easily manipulated by the transmission equipment and coding techniques can be used to ensure their safe transmission. For example, in order to ensure the error-free (low-error rate) transmission of data packets on a particular communication link, the packets may be subdivided into blocks and encoded with a forward error correcting code (FEC). Typically, this is done using a common block size as this allows the use of standardized encoding and decoding equipment at each end of the communication link which is independent of the size of the data packets to be transmitted.

While some physical layer protocols allow physical layer blocks for different higher-protocol-layer packets to be interleaved, other physical layer protocols require the physical layer blocks to be transmitted consecutively for a given packet. This is the case, for example, where only the first physical layer block for a given packet contains information about the identity of the packet. In such protocols an existing packet (or its associated blocks) cannot be "interrupted" to transmit other packets which may have a priority higher than that of the packet in the process of being transmitted. As the packets may be of varying size, depending of the user's application, high priority packets may be inappropriately delayed while waiting for long lower priority packets to complete their transmission.

This problem is exacerbated if the packets are of widely varying sizes. The presence of long user packets in the data stream can significantly increase the jitter or variation in the arrival time of other packets in the stream and seriously affect the overall performance.

For example, in a commonly used transmission scheme known as the ATSC A/53 Digital data/television standard, the user data is grouped into blocks of 188 bytes and transmitted at a rate of 10.7 mega-symbols per second or 21.4 Megabits/second. Thus, the transmission of each block with this standard requires approximately 76 micro-seconds (psec). User packets typically range from a few bytes to over 1500 bytes, and in accordance with this particular standard, may require anywhere from 1 to 9 blocks for transmission, depending on their length. This translates into a transmission time of at least 76 $\mu$sec (1 block) and as high as 684 $\mu$sec (9 blocks) for each packet. As a result, the jitter (or variability in arrival time) observed for speech or video packets interspersed with other large packets may fluctuate from 76 $\mu$sec to 684 $\mu$sec which leads to a substantial degradation in performance.

In conventional systems, it is up to the scheduler process in the transmitter to try to organize the transmission of the packets such that the higher priority packets are not unduly delayed by other less important packets which have a lower priority. In so doing, the scheduler must leave enough room on the communication link to allow for the transmission of higher priority packets when necessary. However, this often results in an inefficient use of the communication links which can also seriously affect the overall performance of the communication network.

In view of these problems, it would be desirable to be able to "interrupt" the transmission of an existing packet. As noted above, there may be situations where some packets are more important than others and may require transmission without being unduly delayed. This would occur where, for example, time sensitive data such as a speech packet must be transmitted while a long data packet is in the course of being transmitted. The speech packet may be time sensitive in the sense that if it does not arrive in time at the receiver, there will be an audible interruption to the received speech. The longer data packet is typically of lower priority as it may be part of computer-to-computer communication in which a protocol such as the Transmission Control Protocol/Internet Protocol (TCP/IP) is being used to control the transport of a larger message composed of a number of packets which may arrive slowly (over an interval of a few milliseconds or seconds) at the intended destination.

Accordingly, there is a need to provide a communication network with an efficient method for interrupting the transmission of existing (low-priority) packets to insert one or more new (higher priority) packets.

SUMMARY OF THE INVENTION

It is an object of the present invention to obviate or mitigate one or more of the above-identified disadvantages.

For systems in which packets are each transmitted as a series of consecutive physical layer blocks, this invention provides a method and apparatus for efficiently interrupting the transmission of an existing packet to send one or more interrupting packets which may have a higher priority than that of the existing packet. When an interrupting packet must be sent, the transmission of physical layer blocks used for the existing packet is interrupted to allow the transmission of at least one new block for the interrupting packet. The presence of the interrupting packet within the new block is efficiently denoted by existing fields which are already used for a different function when there is no interrupting packets.

In a preferred embodiment, the invention is used in connection with common transmission schemes known as the Data Over Cable Service Interchange Specification (DOCSIS) or the Asynchronous Transfer Mode (ATM) adaptation layer 2 (AAL2) format of the International Telecommunications Union (ITU) recommendation I363.2. In these schemes, the presence of a new packet in a physical layer block is indicated as part of the block format. In the DOCSIS specification, the presence of a new packet is indicated by a Payload Unit Start Indicator (PUSI) and a Pointer Field (PF). In the ATM AAL2 I.363.2 format, an OffSet Field (OSF) is used. The presence of an new interrupting packet in a physical layer block is denoted by setting the PUSI/PF or OSF to an unused value (and formely invalid) to flag the new packet as an interrupting packet.

Advantageously, the method provided by the present invention can be practised recursively to accommodate multiple levels of interruption. As such, an interrupting packet can itself be interrupted by another, perhaps more important packet. When the transmission of an interrupting packet is complete, the transmission reverts back to the preceding level of interrupted packets until all levels of interruption are completed. With this method, multiple levels of interruption may be realized to efficiently regulate the transmission of packets with different priorities.

By comparison with existing methods, another advantage of the present invention is that the scheduling of packets is significantly simplified. Because data packets can be interrupted whenever necessary, they can be transmitted anytime without delaying the transmission of higher priority packets. As a result, the idle periods are reduced and the communication links present in a network are more efficiently used.

Yet still another advantage of the present invention is that the jitter in the arrival time of higher priority packets can be better controlled which results in a significant improvement in transmission performance.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Preferred embodiments of the invention will now be described with reference to the attached drawings in which.

DETAILED DESCRIPTION OF THE PREFERRED EMBODIMENTS

Figure 1:
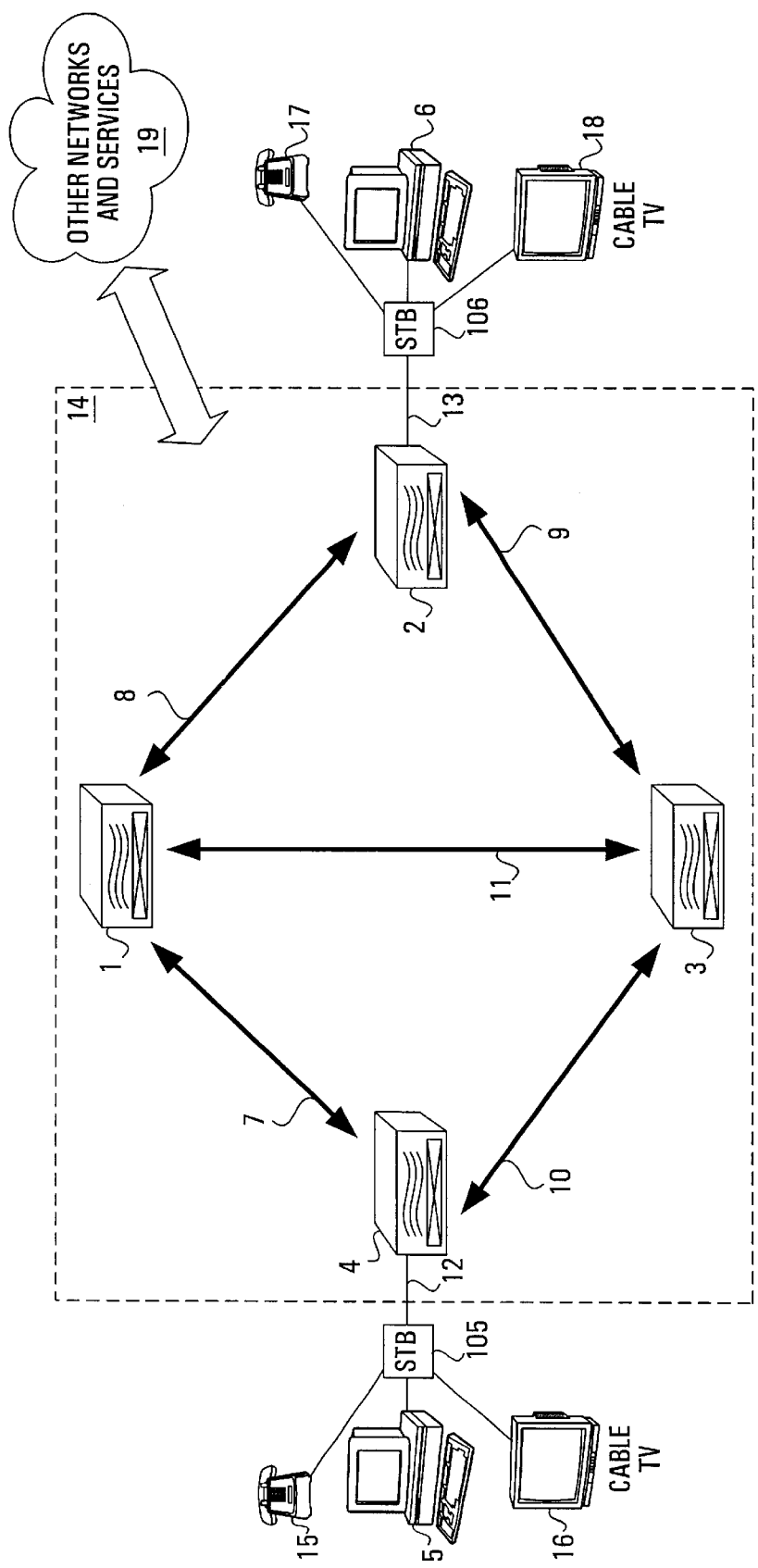
FIG. 1 is a block diagram of a communications network and subtending user equipment.

This invention provides a network with a method to interrupt the transmission of an existing packet to insert one or more packets of a higher priority. The invention can be incorporated in any network topology or configuration. For simplicity however, the invention will now be described only in relation to a communications network (hereinafter referred to as "the network"). An example of a network is shown in FIG. 1 as generally indicated by 14.

The network 14 illustrated therein is composed of a plurality of nodes indicated by 1, 2, 3, 4 (only four shown) Each of these network nodes 1, 2, 3, 4 is linked to others of the network nodes 1, 2, 3, 4 by one or more communication links X respectively 7, 8, 9, 10, 11.

The network 14 is also interconnected with other networks 19 to provide network users with a variety of services such as Internet-based services, cable TV or access to the public switched telephone network (PSTN). These services are remotely available to users by way of access connections 12, 13 (only two shown) to the nodes 1, 2, 3, 4. As is the case with most network access connections, these connections 12, 13 may be implemented with coaxial cables, telephone lines or alternatively implemented with radio. As such, the connections 12, 13 have a limited bandwidth and efficient use of them is quite important.

FIG. 1 shows a typical connection arrangement for multi-service access which consists of terminating each access connection 12, 13 by a respective set-top-box (STB) 105, 106 with connections to a personal computer (PC) 5, 6 for access to Internet-based services, a telephone set 15, 17 for voice services and a television set 16, 18 for video services. The STBs 105, 106 are shown on FIG. 1 as stand-alone devices. It is understood that the STBs 105, 106 could alternatively be implemented within the PCs 5, 6 or in the further alternative, within any other device which can be modified to incorporate the STB functionality.

The user information exchanged on either connection link 12, 13 may consist of voice, video, data or a combination thereof, depending on which services are operational. For example, a user at the PC 5 may connect to the network 14 for down loading a file from an Internet site and at the same time, talk on the phone 15 to another user on the phone 17 also connected to the network 14 through the STB 106, in which case both data and voice information would be exchanged on the communication link 12.

In FIG. 1, each STB 105, 106 provides the necessary interface for the exchange of user information between the network 14 and the telephone sets 15, 17 for voice services, the television sets 16, 18 for video services and the service applications loaded in each PC 5, 6 (not shown) for computer-based services. As such, the STBs 105, 106 convert the user information received into a suitable format and forward the converted information to the intended destination. For example, in the course of a telephone conversation between two users connected through the network 14 with the phones 15, 17, the speech information generated by the telephone set 15 which is intended for the other set 17 is first converted by the corresponding STB 105 into a format for transmission to the network 14 over the associated communication link 12. The converted information traverses the network 14 and reaches the other STB 106 where the information is converted back into a format suitable for use by the other telephone set 17. The same process also applies in respect to speech information travelling from the telephone set 17 to the set 15 and also to any other types of information travelling through the STBs 105, 106. The manner in which this information is converted by the STBs 105, 106 is well-known in the art and is not described here in any detail.

The user information exchanged between the STBs 105, 106 and the network 14 is arranged in the form of packets which are each packaged with a header containing identification information such as the packet type and length. The packets are formatted according to the Data Over Cable Service Interchange Specification (DOCSIS). DOCSIS is a well-known transmission scheme which is widely used to access networks for the exchange of multi-media information as it has defined a number of different packet formats. These packet formats can be used for the transmission of video or data.

Figure 2:
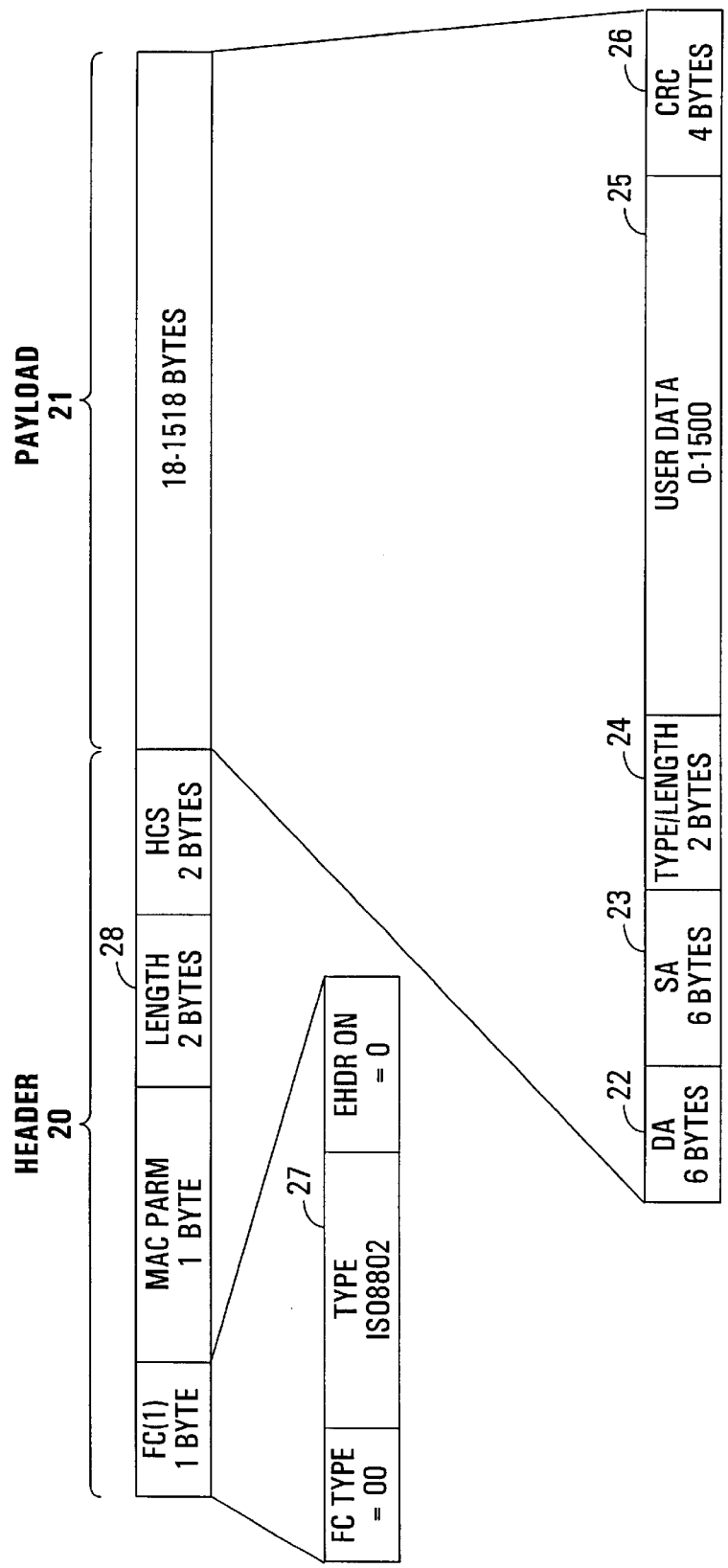
FIG. 2 is a diagram of a data packet defined by the data over cable service interchange specification (DOCSIS) which is used to carry ISO8802 data packets in the network of FIG. 1.

FIG. 2 shows as an example the format specified by the DOCSIS standard to carry an ISO8802 data packet. For simplicity, the data packet shown in this figure is hereinafter referred to as a DOCSIS packet. The DOCSIS packet is only representative of a particular format specified by DOCSIS and it is to be noted that DOCSIS also specifies other formats to carry different types of data packets. It is to be understood in this description that by referring to a DOCSIS packet, reference to other formats is also implied.

The format for the DOCSIS packet shown in FIG. 2 is formed of a payload 21 to contain the ISO8802 data packet and a six byte header 20. The ISO8802 data packet contained in the payload 21 is itself comprised of a destination address (DA) 22 specifying the address of the intended destination of the ISO8802 packet, a source address (SA) 23 specifying the source address of the packet, a type/length field 24 specifying the type and length of the payload 21, the 0 to 1500 bytes of user data 25 carried by the packet and a cyclic redundancy code (CRC) 26 which acts as an error detection code to detect the occurrence of transmission errors in the payload 21. The ISO8802 data packet in the payload 21 is used for carrying a portion of the user data to be transmitted and is packaged with the header 20 which contains a number of standard DOCSIS fields to properly identify the ISO8802 packet and its contents. Of particular interest are the fields identifying the packet type 27 (ISO8802) and length 28 which, for an ISO8802 packet, can range from 18 bytes (just the DA 22, the SA 23, the type/length field 24 and the CRC 26) to 1518 bytes (full length).

For the transmission of packets such as the DOCSIS packet illustrated in FIG. 2, it is often convenient to block each packet into smaller chunks known as physical layer blocks. By subdividing each packet into smaller blocks, the packets can be more easily manipulated by the transmission equipment. Moreover, coding techniques can be used to improve the reliability of the transmission and enhance performance. For example, in order to reliably transmit data packets between the STB 105 and node 4 of the network 14 over the communication link 12 (see FIG. 1), the packets are first subdivided into blocks and then are encoded with a forward error correcting code (FEC). Typically, this is done using a common block size as this allows the use of standardized encoding and decoding equipment at each end of the communication link 12 which is independent of the size of the data packets to be transmitted.

An example of this is the DOCSIS transmission of data or video information between the STBs 105, 106 and the network 14. For this, DOCSIS specifies a common block size of 188 bytes. As is well known, the 188 byte block size specified was selected to be compatible with a common video image coding scheme developed by the Motion Picture Experts Group (MPEG) so that the encoding and decoding of the physical layer blocks could be standardized. The physical layer blocks formatted in accordance with the MPEG standard are commonly referred to as MPEG physical layer blocks or simply MPEG blocks.

As noted above, the common block size of 188 bytes defined by DOCSIS for the transmission of data or video packets permits the use of standard coding techniques to improve the reliability of transmission. Accordingly, the MPEG blocks used for the transmission of DOCSIS packets between the STBs 105, 106 and the network 14 are encoded with a FEC referred to as the Reed Solomon (RS) code (188,204). The RS coding scheme encodes the 188-byte block to a physical layer block of 204 bytes with the ability to correct up to 10 bytes of errors in transmission. To further describe the format of the MPEG blocks used for transmitting DOCSIS packets, reference is now made to FIG. 3A which shows, as an example, the format of an MPEG physical layer block encoded with the RS code (188,204).

The MPEG physical layer block shown therein is comprised of a data payload 30 for carrying DOCSIS packets or a portion thereof, a 16 byte RS-FEC code 31 for correcting potential transmission errors and an optional pointer field 32 to identify the beginning of each included DOCSIS packet (further details below). According to the MPEG standard, the optional pointer field 32 uses one byte and the data payload 30 is 183 or 184 bytes long, depending on whether or not the pointer field 32 is present in the MPEG block to signify the beginning of a new DOCSIS packet (further details below). The MPEG block is packaged with a 4 byte header 33 which mainly serves to mark the block's boundaries and control its transmission.

As is well known, DOCSIS packets are of varying sizes and do not fit perfectly into the fixed length MPEG block size. As such, the transmission of a DOCSIS packet may require several MPEG blocks or alternatively, one MPEG block may be sufficient to transmit several DOCSIS packets. As multiple MPEG blocks can be used to transmit a DOCSIS packet or alternatively, as a single MPEG block can be used to transmit several DOCSIS packets, it becomes desirable for a receiver used in the network 14 or in either the network or one of the STBs 105, 106 (see FIG. 1) to have the ability to locate the beginning of every DOCSIS packet received for the purpose of reassembly and processing. If there were no errors in transmission, the receiver might choose to find any DOCSIS packet by decoding all the incoming packets from the MPEG physical layer blocks and watching their length fields. As was described above, these length indicators show the length of the DOCSIS packets, and hence may be used to find the starting place of the next packet in an incoming stream of data.

However, if there are errors in transmission or one of the MPEG physical layer data blocks is lost, the receiver will be unable to find the beginning of the next DOCSIS packet as it re-synchronizes itself to correctly receive and decode the MPEG physical layer blocks. The DOCSIS packet headers are generally indistinguishable in the data stream from the data they carry and thus cannot easily be found by simply looking at the data stream. Some data transmission systems make use of a packet header that is distinguishable from the data, but doing so is inefficient and substantially reduces the number of possible data patterns for transport and, as a result, is not the preferred method for this application.

In order to identify the beginning of each DOCSIS packet transmitted, the MPEG block is packaged with the optional pointer field 32 and a payload unit start indicator (PUSI) bit 34 which is contained in the header 33. In addition to the PUSI 34, the MPEG header 33 also includes synchronization fields (not shown) and information relating to service identification and transport priority (not shown). This additional data contained in the MPEG header 33 is well-known in the art and is not be described here in any detail.

According to the DOCSIS standard, the begining of DOCSIS packets may be placed anywhere within the payload 30. While at the beginning of a transmission, the first MPEG block sent will typically coincide with the start of the first DOCSIS packet to be transmitted, after a few MPEG blocks and with a mixture of sizes of DOCSIS packets, there is no fixed relation between the MPEG physical layer block boundaries and the DOCSIS packets. That is, for any given MPEG block, a DOCSIS packet (and its corresponding header) may start anywhere within the payload 30 portion and, as a result, may overlap the block boundaries to extend into subsequent MPEG blocks.

As noted above, the PUSI bit 34 is part of the MPEG block header 33. If the PUSI bit 34 is set, it indicates that the MPEG block contains the start of a DOCSIS packet, and that the first byte after the MPEG header 33 contains a pointer (the pointer field 32) to the beginning of the DOCSIS packet. In between the pointer field 32 and the beginning of the DOCSIS packet, there may be either the tail end of a previous DOCSIS packet, or in some cases, some fill (unused) bytes. As such, a receiver may examine the MPEG block header 33 and learn where the next DOCSIS packet starts within the MPEG block. If the PUSI bit 34 is not set, it indicates that the payload 30 is the continuation of a packet started in a previous block and that this continuation fills this entire block. In this way, the variable sized DOCSIS packets can be efficiently placed into the standard size MPEG physical layer blocks.

According to the MPEG standard, the pointer field 32 is one byte. As such, the pointer field 32 may accomodate numbers in the range 0 to 255. The maximum payload size in the MPEG block is 183 bytes, which leaves the pointer field values from 184 to 255 unused.

The Asynchonous Transfer Mode (ATM) adaptation layer 2 (AAL2) format of the International Telecommunications Union (ITU) recommendations I363.2 makes use of a similar technique to pack data packets in standard physical layer blocks. To further illustrate this, reference is now made to FIG. 3B which shows the format of an example of an ATM physical layer block (hereinafter referred to as an "ATM cell") used for that particular ATM communications protocol.

The ATM cell shown therein is comprised of a data payload 110 for carrying data packets or a portion thereof and an offset field (OSF) 113 to identify the beginning of any included data packet. According to the ATM AAL2 standard, the data payload 110 is 47 bytes long while the optional OSF 113 shares a byte with a one bit sequence number 112 and a one bit parity field 111. The ATM cell is packaged with a 5-byte header 114 which serves to mark the block's boundaries and control its transmission.

Figure 3A:
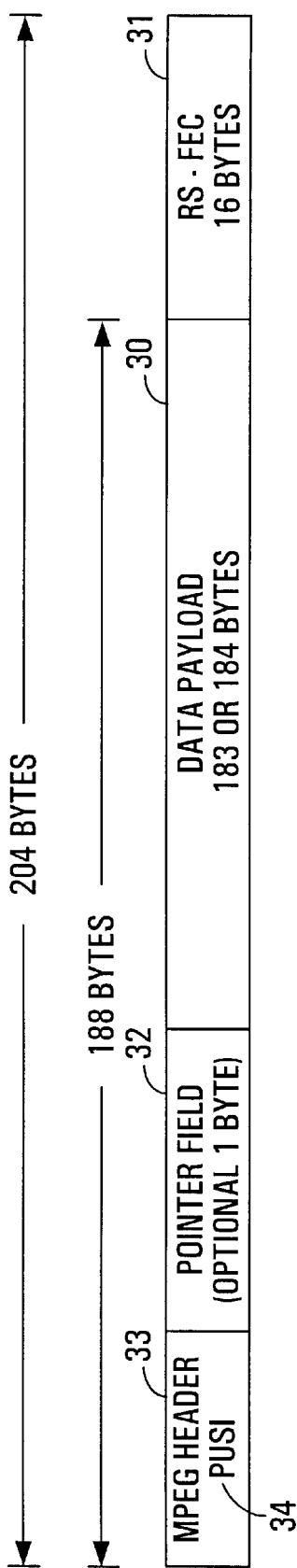
FIG. 3A is a diagram of a Motion Picture Experts Group (MPEG) block used for transmitting packets such as the ISO8802 data packet illustrated in FIG. 2.
Figure 3B:
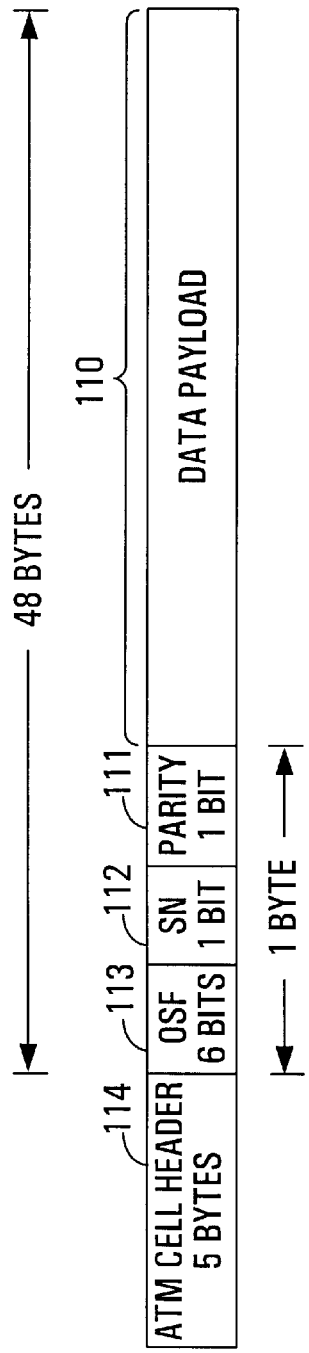
FIG. 3B is a diagram of an Asynchronous Transfer Mode (ATM) adaptation layer 2 (AAL2) cell defined by the International Telecommunications Union (ITU) recommendation I363.2.

The role of the OSF 113 within the ATM cell is similar to that of the pointer field 32 and the PUSI bit 34 within the MPEG block illustrated in FIG. 3A. As such, the OSF 113 is also used to indicate the presence of a new data packet in the ATM cell. More specifically, the OSF 113 is used to signal the presence of any new data packet and point to the beginning of the data packet within the ATM cell payload 110. With its 6-bit size, the pointing values that the OSF 113 can accomodate range from 0 to 63. However, as the ATM cell payload 110 is only 47 bytes long, only values up to 47 are used. According to the ATM AAL2 standard, the values in the range of 48 to 63 are not used.

Figure 4:
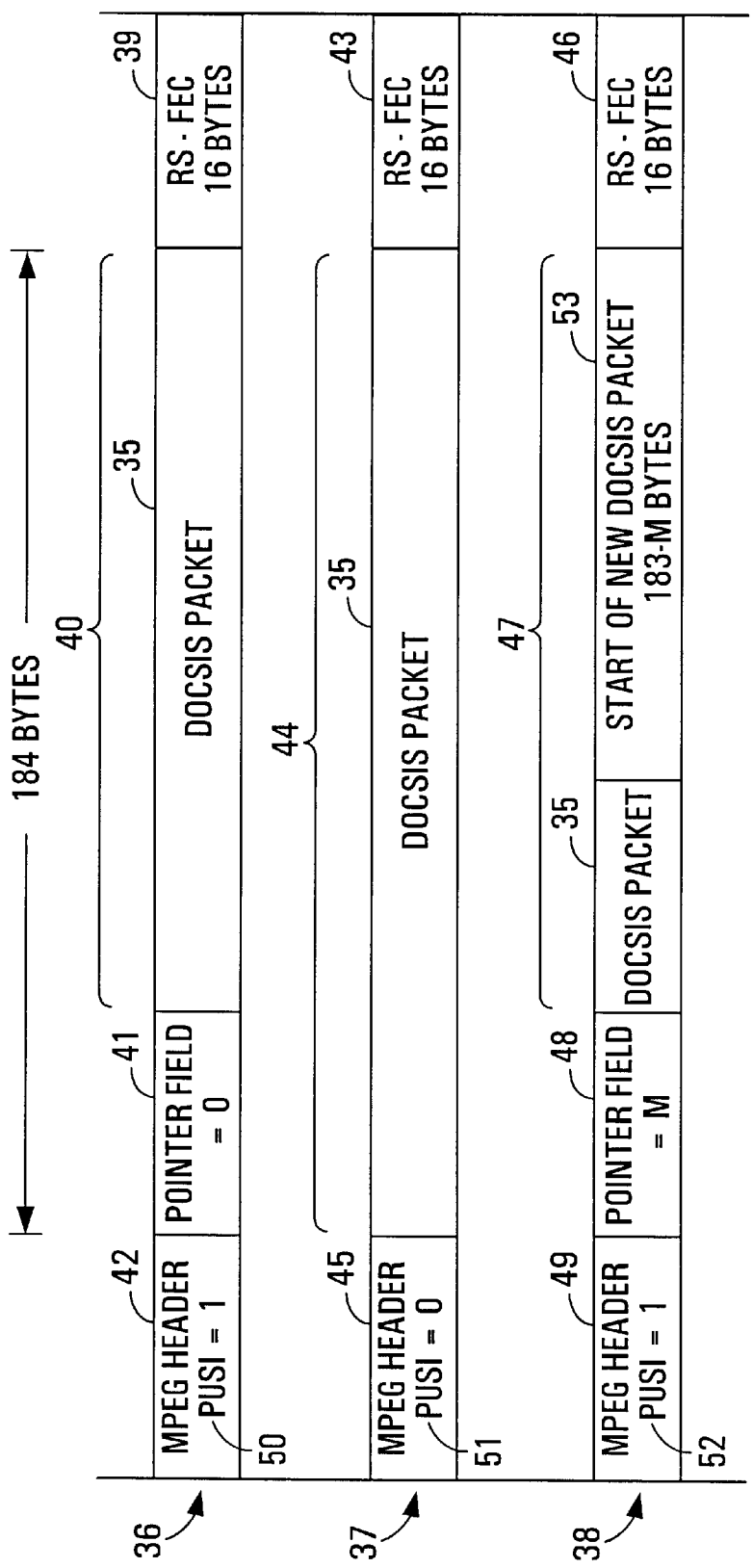
FIG. 4 is a diagram of three MPEG blocks used for transmitting a longer packet.

Considering again the transmission of data with MPEG physical layer blocks, reference is now made to FIG. 4 which further illustrates how DOCSIS packets may be placed into multiple MPEG blocks by the use of the PUSI bit and the pointer field. In particular, this figure shows a DOCSIS packet 35 extending over three MPEG blocks respectively numbered 36, 37 and 38. For this example, it is assumed that the first MPEG block 36 coincides with the start of the DOCSIS packet 35 illustrated therein.

Similarly to the MPEG block described above in reference to FIG. 3A, the first MPEG block 36 is formed of a 16 byte RS-FEC code 39, a data payload 40 and a pointer field 41 all packaged with an MPEG header 42 which includes a PUSI bit 50. It can be observed that the PUSI bit 50 is set to one to signal the start of the new DOCSIS packet 35 and indicate that the first byte following the MPEG header 42 contains a pointer (the pointer field 41) to the beginning of this packet 35. As this block 36 corresponds to the start of the DOCSIS packet 35, it can also be observed that the value contained in the pointer field 41 is zero which points to the first byte of the data payload 40 where the beginning of the DOCSIS packet 35 is located. It can further be observed that the presence of the pointer field 41 reduces the capacity of the data payload 40 by one byte. As a result, the payload 40 only contains the first 183 bytes of the DOCSIS packet 35.

The second MPEG block 37 shown in FIG. 4 also has a 16 byte RS-FEC code 43 and a data payload 44. This block 37 is packaged with an MPEG header 45 which also includes a PUSI bit 51. It can be observed that contrary to the first MPEG block 36, this block 37 does not have a pointer field as there is no start of packet to flag. It can also be observed that the PUSI bit 51 is set to zero to indicate that this block 37 is a continuation of the DOCSIS packet 35 initiated in the first MPEG block 36 and that this continuation fills the entire block 37. It can further be observed that since there is no pointer field in this block 37, the payload 44 contains the next 184 bytes of the DOCSIS packet 35 following the first 183 bytes of that packet 35 which were placed in the first MPEG block 36.

The third MPEG block 38 is used to transmit the remainder portion of the DOCSIS packet 35 and initiate the transmission of a new packet 53. Similarly to the first and second MPEG blocks 36, 37, this block 38 also has an RS-FEC code 46, a data payload 47 and a header 49 which contains a PUSI bit 52. In addition, the block 38 also has a pointer field 48. It can be observed that the PUSI bit 52 here is set to one to flag the beginning of the new DOCSIS packet 53 and indicate that the first byte following the MPEG header 49 contains a pointer (the pointer field 48) to the beginning of this new packet 53. In contrast to the first block 36, the value contained in the pointer field 48 of this block 38 is set to M which points to the Mth byte of the data payload 47 where the beginning of the new DOCSIS packet 53 is located.

In conventional systems, the use of MPEG blocks together with the PUSI bit and the pointer field such as shown in FIGS. 3 and 4 works well for data services when there is not much urgency for the delivery of packets. Under these conditions, the transmission of any packet must be completed before any other packet can be sent. As a result, once a transmitter starts sending a long user data packet which overlaps several physical layer blocks, it will delay the transmission of all other packets until all of its physical layer blocks have been transmitted. As the transmission of a user packet cannot be interrupted, high priority packets are delayed every time a long packet is transmitted.

According to an embodiment of the present invention, instead of delaying high priority packets when an existing packet of, perhaps, a lower priority is in the process of being transmitted, the existing packet is "interrupted" and the high priority packets (hereinafter also referred to as "interrupting packets") are inserted into the data stream. More specifically, if a high priority packet is to be sent while an existing packet is being transmitted, the transmission of the MPEG blocks of that packet is interrupted, and the high priority packet is inserted into the data stream for transmission.

According to the present invention, the insertion of a high priority packet is preferably initiated with a new MPEG block. If a block is in the process of being transmitted at the time a decision is made to send a high priority packet, the transmission of that block is completed before the high priority packet is sent. Consequently, a high priority packet cannot be delayed any longer than the time necessary to complete the transmission of an existing physical layer block. This represents a substantial improvement over conventional methods since the transmission delay experienced by a high priority packet is effectively reduced from the time required to transmit a packet to the time necessary to transmit a physical layer block. As the transmission delay is reduced, the jitter in the arrival time of higher priority packets is better controlled which results in a significant improvement in transmission performance.

In a preferred embodiment, for the DOCSIS/MPEG standard, the presence of a high priority (interrupting) packet in an MPEG block is signalled by the PUSI bit together with the pointer field. More specifically, when a high priority packet is sent, the PUSI bit is used as described above to denote the presence of a new packet (the high priority packet) while the pointer field is set to indicate that the new packet signalled by the PUSI bit is in fact an interrupting packet and not the end of a low priority packet or the beginning of a new packet of the data stream.

In order to flag the interrupting packets, the present invention utilizes values of the pointer field which are not used for the transmission of non-interrupting packets. It will be recalled that the pointer field is normally used in the MPEG transmission scheme described above to denote the start of a new packet within a physical layer block. The pointer field as defined in MPEG is one byte long which allows pointing up to 255 possible locations within the block data payload. According to the MPEG format, the size of the block payload is only 184 bytes (or 183 bytes when a pointer field is present) which, as a result, leaves the values from 184 to 255 unused. According to the present invention, any of these unused values may be used in the pointer field to indicate the presence of an interrupting packet in the data stream.

Figure 5:
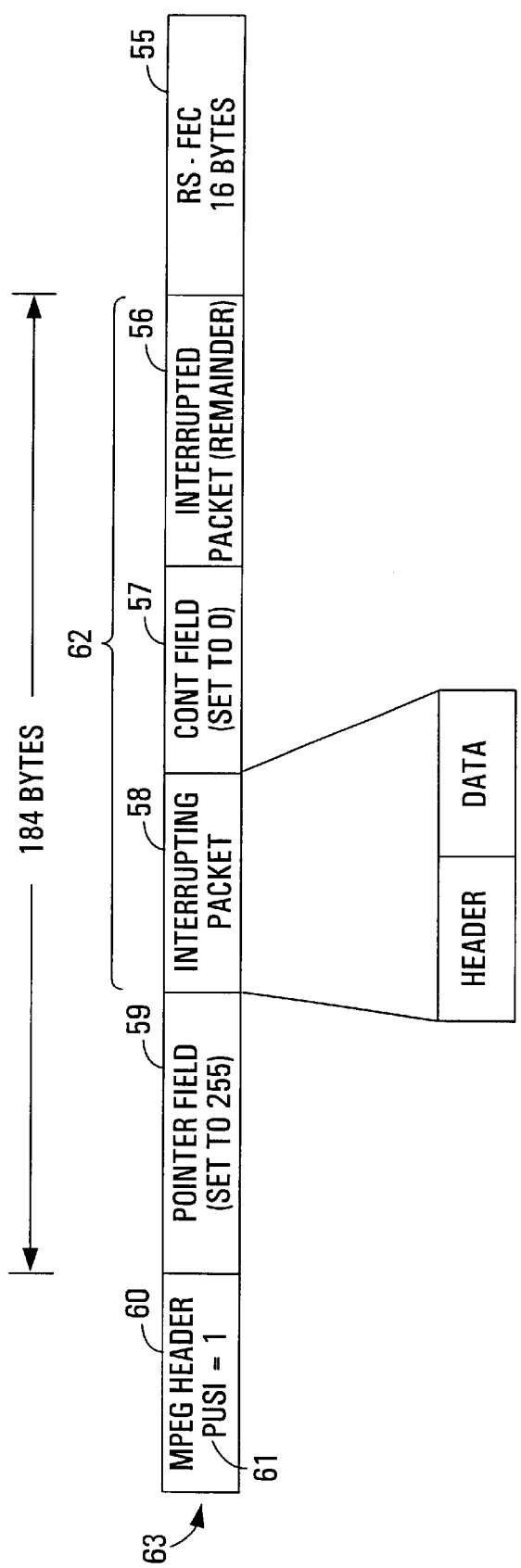
FIG. 5 is a diagram of an MPEG block showing the insertion of an interrupting packet into an existing packet of the data stream according to an embodiment of the invention.

To further illustrate this, FIG. 5 shows as an example, an MPEG block 63 in which an existing packet 56 is interrupted (hereinafter the "interrupted packet") for inserting an interrupting DOCSIS packet 58 with a pointer field 59 set to 255. From this Figure, a number of observations can be made. First, in can be observed that in addition to the pointer field 59, this particular MPEG block 63 is also formed of an RS-FEC code 55, a data payload 62 and an MPEG header 60 which includes a PUSI bit 61. It can also be observed that the PUSI bit 61 of this block 63 is set to 1 to flag the presence of the interrupting packet 58 as a new packet. It can also be observed that the pointer field 59 is set to 255 which indicates that the new packet 58 flagged by the PUSI bit 59 is in fact an interrupting packet. It can still be further observed that the interrupting packet 58 is inserted at the beginning of the MPEG block payload 62.

In order to resume transmission of the interrupted packet 56 or alternatively flag the presence of a further interrupting packet (not shown), the MPEG block 63 used for transmitting the interrupting packet 58 is provided with a continuation field 57, preferably of a length of one byte, which is used as follows: if it is set to zero, the next byte in the MPEG block payload 62 is the continuation of the original interrupted packet 56. If it is not zero, it indicates that the next byte is the first of a following interrupting packet (further details below). In the example of FIG. 5, as there is only one interrupting packet 58, the continuation field 57 of the MPEG block 63 is set to zero to signal that what follows thereafter in the block payload 62 is the continuation of the interrupted DOCSIS packet 56. A receiver may use the length indication in the header of the interrupting packet 58 to determine the exact location of the continuation field 57 in the payload 62.

When an interrupting packet is small enough to be contained in a single physical layer block such as illustrated in FIG. 5, the pointer field used to signal the presence of the interrupting packet and the continuation field used for indicating whether there are any other interrupting packets following limit the capacity of the block payload to 182 bytes. As a result, any interrupting packet which is more than 182 bytes in length will extend into the next block and possibly into subsequent blocks, depending on the length of the interrupting packet to be inserted.

Figure 6:
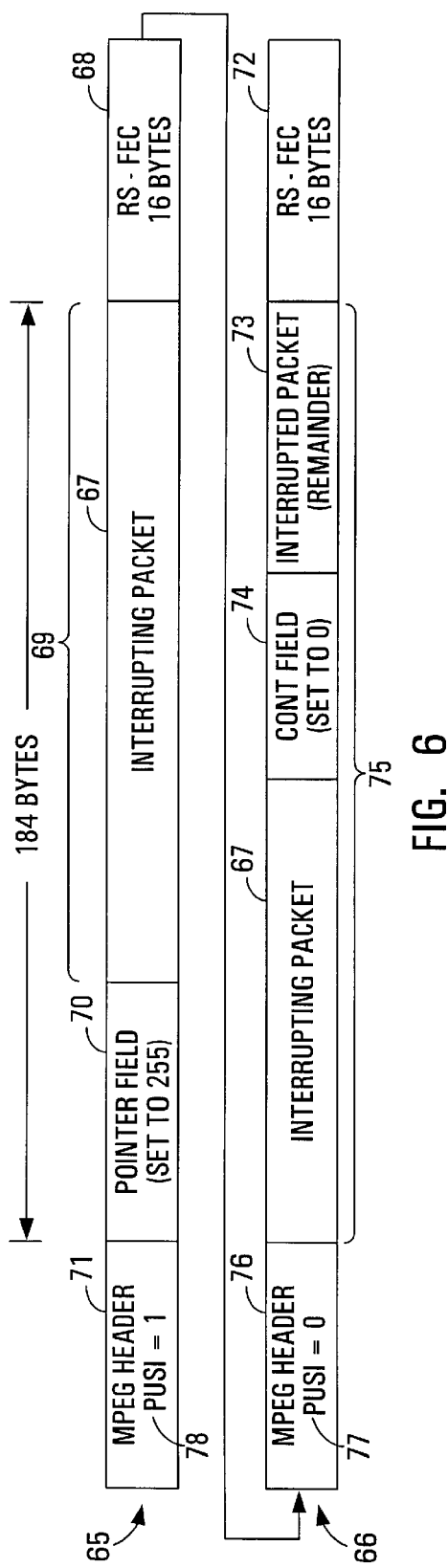
FIG. 6 is a diagram of two MPEG blocks showing the insertion of an overlapping interrupting packet into an existing packet of the data stream according to an embodiment of the invention.

To illustrate this, FIG. 6 provides an example where two MPEG blocks 65, 66 are required to transmit a new packet 67 which is more than 182 bytes in length. With respect to the first block 65, it can be observed that it has an RS-FEC code 68, a data payload 69, a pointer field 70 and a header 71 which contains a PUSI bit 78. It can also be observed that the PUSI bit 78 of the header 71 is set to one to flag the presence of the new (interrupting) packet 67 within the block payload 69. It can further be observed that the pointer field 70 is set to 255 for indicating that the new packet 67 flagged by the PUSI bit 78 is an interrupting packet. It can still further be observed that the interrupting packet 67 extends into the second MPEG block 66 since it is more than 182 bytes in length.

With respect to the second block 66, it can be observed that it is formed of an RS-FEC code 72, a data payload 75 and a header 76 which contains a PUSI bit 77. It can also be observed that the PUSI bit 77 is set to zero to indicate that this block 66 is a continuation of the interrupting DOCSIS packet 67 initiated in the first MPEG block 65 and that it does not contain any new packet. In contrast with the first block 65, it can further be observed that this block 66 does not have a pointer field as there is no start of packet to flag. Considering the block data payload 75 in particular, it can be observed that the interrupting packet 67 is followed by a continuation field 74 which is set to zero to indicate that the remainder portion of the block data payload 75 does not contain any more interrupting packets and instead is used to resume transmission of the interrupted packet 73.

Figure 7:
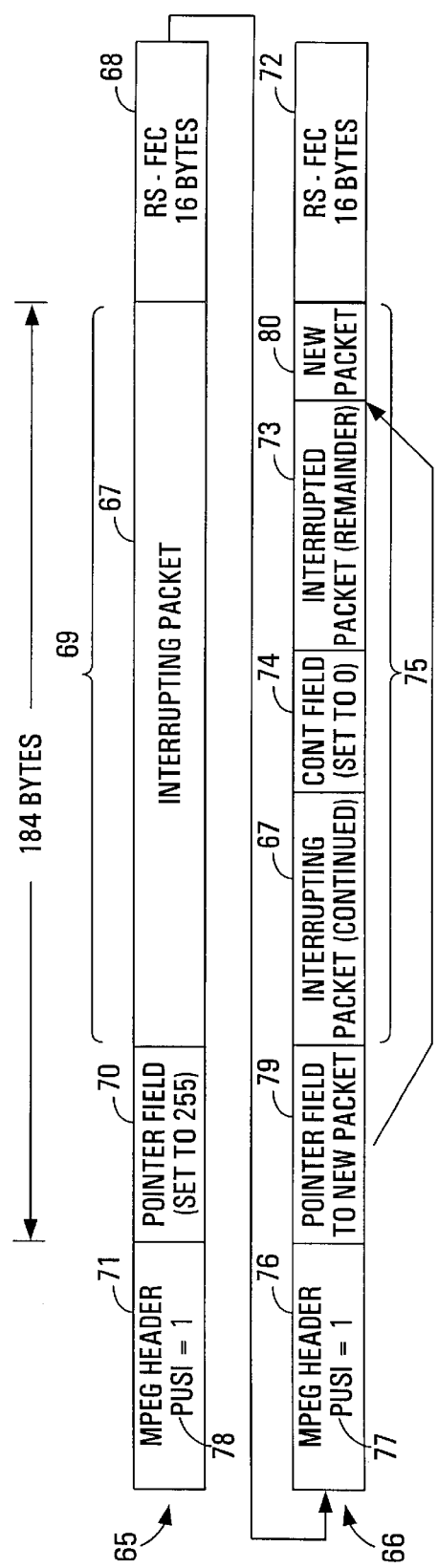
FIG. 7 is a diagram of two MPEG blocks showing the insertion of an overlapping interrupting packet before a new packet of the data stream according to an embodiment of the invention.

In a situation where the remainder portion of the interrupted packet 67 is less than the free space available in the data payload 75 of the second block 66, the unused room in the payload 75 may be used to initiate the transmission of a new packet in accordance with the MPEG standard. This situation is illustrated in FIG. 7 where the example shown in FIG. 6 is reproduced with two variants. The first variant relates to the second block 66 which is now shown with the PUSI bit 77 set to one and with a pointer field 79. The second variant is with respect to the remainder portion of the interrupting packet 67 contained in the payload 75 of the second block 66 which is now shown to be less than the free space available. With respect to these variants, it can be observed that the unused room of the second block 66 is used for initiating the transmission of a new packet 80 in accordance with the MPEG standard. Accordingly, the PUSI bit 77 of the second block 66 is set to one to denote the presence of this new packet 80 and the associated pointer field 79 is set to point to the beginning of the new packet 80.

The examples described above in reference to FIGS. 5, 6 and 7 all relate to the insertion of a single interrupting packet into the data stream. There may be situations where it is desirable to send more than one interrupting packet. According to the present invention, the non-zero values of the continuation field can be chosen to notify a receiver that there are more interrupting packets to come and in particular, provide an indication as to the number of interrupting packets to follow. As an example, in a situation where three interrupting packets must be sent, the continuation field used after the transmission of the first interrupting packet could initially be set to two, indicating that two interrupting packets are yet to be transmitted. After the transmission of each remaining interrupting packet, the continuation field would be decremented by one to reflect the number of interrupting packets left to transmit. Accordingly, after the last interrupting packet, the continuation field would be set to zero indicating the resumption of the interrupted packet.

Figure 8:
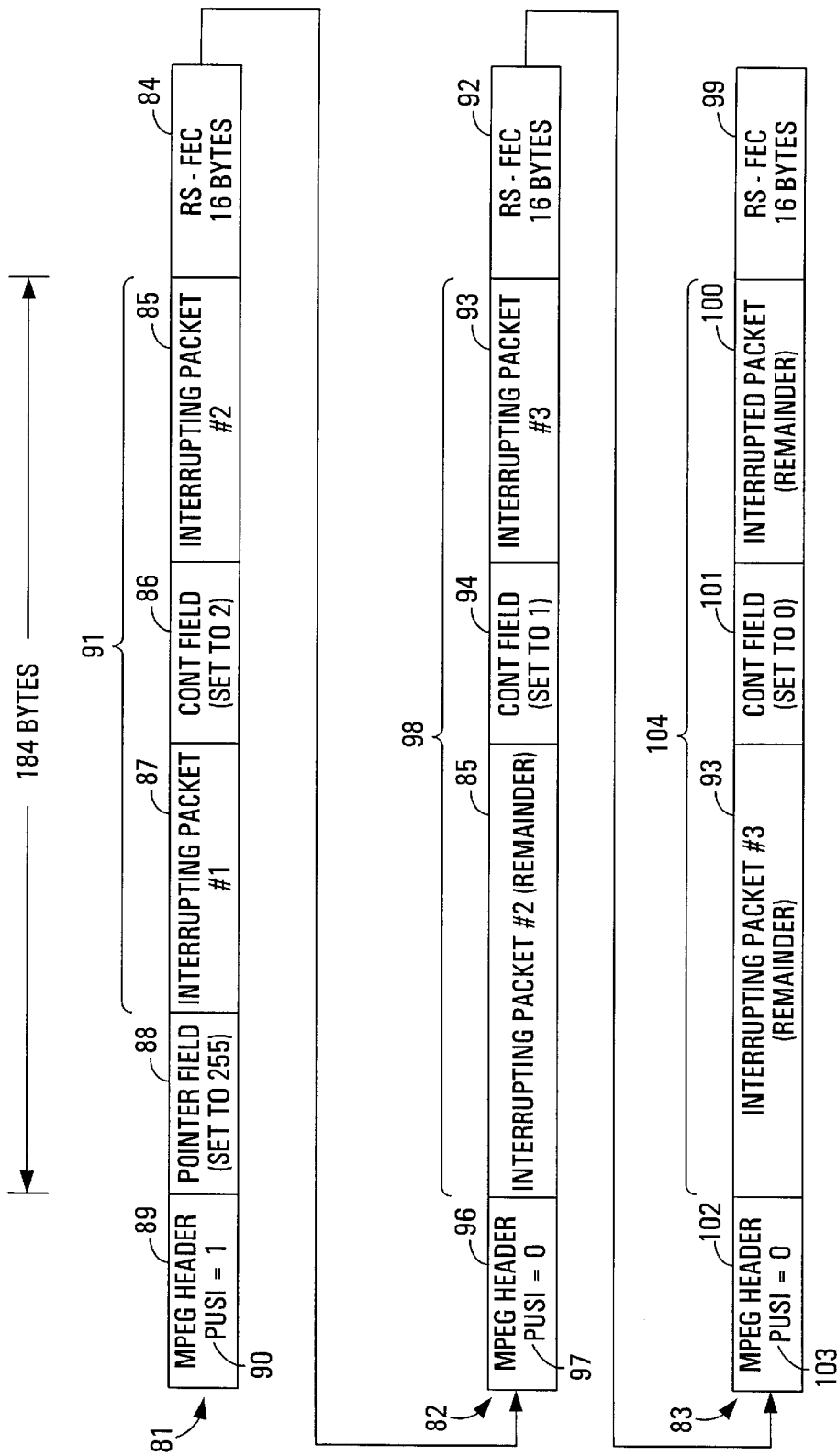
FIG. 8 is a diagram of three MPEG blocks showing the insertion of three interrupting packets into an existing packet of the data stream according to an embodiment of the invention.

To further illustrate this, FIG. 8 shows as an example, a situation where an existing packet 100 is interrupted and three interrupting packets 87, 85, 93 are inserted into the data stream using three MPEG blocks 81, 82, 83. With respect to the first block 81, it can be observed that it has an RS-FEC code 84, a data payload 91, a pointer field 88 and a header 89 which contains a PUSI bit 90. It can also be observed that the PUSI bit 90 and the pointer field 88 are respectively set to one and 255 for denoting the presence of the first interrupting packet 87 located at the beginning of the block payload 91 immediately following the pointer field 88. It can further be observed that the first interrupting packet 87 is followed by a continuation field 86 which is set to two for indicating that there are two further interrupting packets 85, 93 to follow. Immediately after the continuation field 86, the second interrupting packet 85 follows and extends into the second MPEG block 82.

The second block 82 is similarly arranged to the first block 81 described above and as such, has an RS-FEC code 92, a data payload 98 and a header 96 which contains a PUSI bit 97 set to zero. With respect to this block 82, it can be observed that in contrast to the first block 81, the second block 82 does not have a pointer field. It can also be observed that the data payload 98 contains the remainder portion of the second interrupting packet 85. This is followed by a continuation field 94 which is set to one to indicate that the next packet 93 (the third interrupting packet) is also an interrupting packet. It can also be observed that the third interrupting packet 93 begins immediately after the continuation field 94 and extends into the third MPEG block 83.

The third block 83 is similarly structured to the first and second blocks shown second MPEG block shown in this Figure and, as such has an RS-FEC code 99, a data payload 104 and a header 102 which contains a PUSI bit 103. With respect to this block 83, it can be observed that the PUSI bit 103 is set to zero to indicate that this block 83 is a continuation of the third interrupting packet 93 initiated in the second block 82 and that it does not contain any new (regular or interrupting) packet. As such, no pointer field is used. Considering the block data payload 104, it can be observed that the third interrupting packet 93 is followed by a continuation field 101 which is set to zero to indicate that the remainder portion of the block data payload 104 does not contain any more interrupting packets and instead is used to resume transmission of the interrupted packet 100.

The use of a continuation field (see FIG. 8) to indicate the number of following interrupting packets is useful when the number is known at the time the interruption begins. However, in some cases, an additional packet of the same priority level as the interrupting packet may arrive at a scheduler for transmission while the current interrupting packet is being transmitted. If the continuation field was being used to indicate the number of following interrupting packets, this new interrupting packet would not have been included in the count sent earlier. The newly arriving packet could not be sent until the resumption of transmission of the interrupted packet is complete. Generally, it would be preferable for the scheduler to simply send this new (additional) interrupting packet after transmission of the current interrupting series of MPEG blocks is complete. In order to do this, the scheduler may need to send a greater number of interrupting packets than may have been previously indicated by the continuation field. Preferably in this case, a non-zero value of the continuation field is used to indicate a following interrupting packet of the same priority level, and a zero value of the continuation field is used to indicate the continuation of a previously interrupted packet.

The above examples have described how the present invention can be used with the DOCSIS/MPEG transmission format to insert interrupting packets into a data stream. A similar method may also be used to allow insertion of interrupting packets in the ATM AAL2 (ITU I.363.2) transmission format. In order to flag the interrupting packets with this standard, the present invention utilizes values of the OSF which are not used for the transmission of non-interrupting packets. It will be recalled that the OSF as defined in ATM AAL2 (ITU I.363.2) is 6 bits long which allows pointing up to 63 possible locations within the ATM cell payload. According to the ATM AAL2 (ITU I.363.2), the size of the cell payload payload is only 47 bytes which, as a result, leaves the values from 48 to 63 unused (the value of 47 being used to indicate that no new packet is present within the cell). Any of these unused values may be used in the OSF to indicate the presence of an interrupting packet in the data stream.

Figure 9:
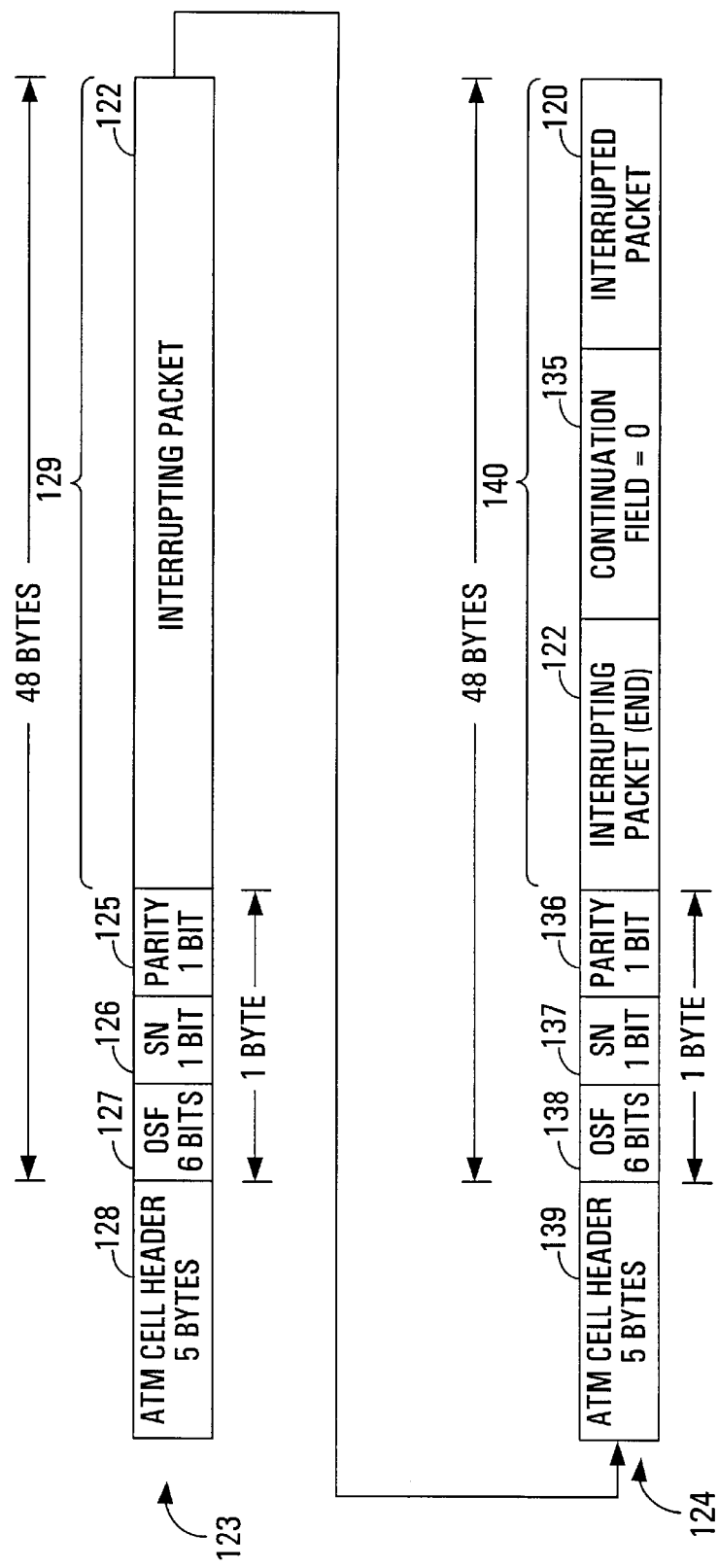
FIG. 9 is a diagram of two ATM cells showing the insertion of an overlapping interrupting packet into an existing packet of the data stream according to another embodiment of the invention.

To further illustrate this, reference is now made to FIG. 9 which shows as an example, a situation where an existing packet 120 is interrupted and an interrupting packet 122 is inserted into the data stream using two ATM cells 123, 124. The first ATM cell 123 has a data payload 129, a parity bit 125, a sequence number 126, an OSF 127 and a header 128.

The OSF 127 is set to (the conventionally unused value of) 63 to flag the start of a new interrupting packet 122 in the ATM cell 123 following the parity bit 125. In this particular example, the interrupting packet 122 extends into the next physical ATM cell 124 as it is more than 47 bytes in length.

The second ATM cell 124 is also formed of a data payload 140, a parity bit 136, a sequence number 137, an OSF 138 and a header 139. It can be observed that the OSF 138 is set to 47 to indicate that this ATM cell 124 is a continuation of the interrupting packet 122 initiated in the first ATM cell 123 and that it does not contain any new packet. Considering the ATM cell payload 140 in particular, it can be observed that the interrupting packet 122 is followed by a continuation field 135 which is set to zero to indicate that the remainder portion of the cell data payload 140 does not contain any more interrupting packets and instead is used to resume transmission of the interrupted packet 120.

In the above example, the second ATM cell 124 does not contain any new interrupting or non-interrupting packets following the transmission of the interrupting packet 122. In situations where more interrupting or non-interrupting packets must be transmitted, the OSF 138 defined in the ATM AAL2 (ITU I.363.2) format and the continuation field 135 are used in the same general manner as the pointer field and the continuation field described above in relation to the MPEG format.

According to the present invention, the interrupting process described above is recursive. As such, it is possible for an interrupting packet that extends across a physical layer block to be itself interrupted by another packet with perhaps a higher priority than that of the original interrupting packet being interrupted. In order to insert an interrupting packet (hereinafter referred to as a "higher priority interrupting packet") into another existing interrupting packet (hereinafter referred to as a "lower priority interrupting packet"), the method described above for interrupting the transmission of an existing packet and inserting a high priority packet is simply repeated.

According to the present invention, the insertion of a higher priority interrupting packet into a lower priority interrupting packet is preferably initiated with a new physical layer block. If a block of the lower priority interrupting packet is in the process of being transmitted at the time a decision is made to send the higher priority interrupting packet, the transmission of that block is completed before the higher priority packet is sent. The presence of the higher priority packet in a block is signalled in the same manner a single interrupting block is denoted in a block (i.e. with the PUSI/pointer field indicators or the OSF indicator, depending on which transmission format is used). This was described in details above and is not repeated here. Following completion of the transmission of the higher priority packet, the transmission of the interrupted lower priority interrupting packet is resumed.

For situations where multiple levels of interruptions are required, the above-described recursive method is repeated for each interrupting packet to be inserted. In these situations, it is up to the receiving device to keep track of the interrupting and interrupted packets and assemble them all together when the interruptions are completed. In order to accomplish this, the receiver must be designed with the ability to collect the packets received into different stacks according to their level of interruption so that the packets can be subsequently reassembled for processing. The manner in which this is implemented would be obvious to a person skilled in the art and, as such, is not described here in any detail.

According to the invention, the above-described method of interrupting packets to insert higher priority packets in the data stream can be implemented in various ways. Preferably, the method is implemented as part of the scheduling process responsible for the transmission of data packets at the physical layer level. There are many ways to implement the scheduling process. Typically, the scheduling process is carried out by a scheduler but can also be carried out by any other network device (e.g. router) which incorporates the necessary functionality for scheduling data packet transmission.

One example of the scheduling process necessary for interrupting packets in accordance with the present invention will now be described. The scheduling process used with the DOCSIS/MPEG standard is similar to that necessary for use with the ATM AAL2 (ITU I.363.2) format. As such, only the scheduling process used with the DOCSIS/MPEG standard will be described below in reference to FIGS. 11A, 11B, 11C, and 11D. To begin, the process flow involved in assembling physical layer blocks from a series of incoming data packets of different priorities and lengths will be described as this is required for an understanding of the scheduling of interruptions.

Figure 10:
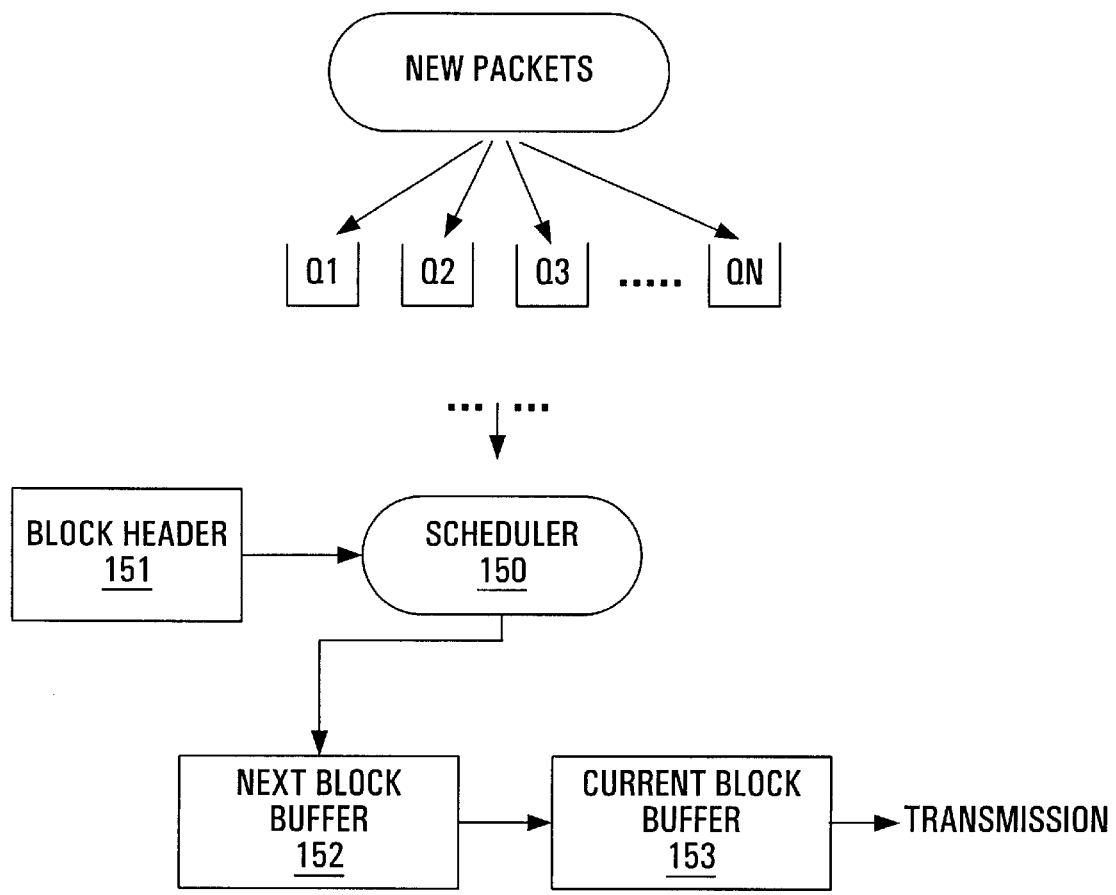
FIG. 10 is a flow chart of a conventional scheduler process used for packet transmission.

Referring to FIG. 10, there is illustrated a flow chart of a typical process flow used for packet transmission. At the top of the flow chart, there is indicated the event of the arrival at a scheduler 150 of new data packets to be transmitted. As is well known, each new packet will have a respective priority designated for it which indicates whether it should be sent before or after other packets awaiting transmission. Each new packet is stored in a particular logical queue (Q) which corresponds to the packet priority level. The flow chart of FIG. 10 shows a plurality N of these queues Q1, Q2, QN (only three shown), each with a respective priority level where 1 is the highest transmission priority and N represents the lowest priority. The queues Q1, Q2, QN are each connected to the scheduler 150 which operates to assemble physical layer blocks based on the packets fetched from the queues Q1, Q2, QN and header information received from a block header unit 151.

The bottom section of the flow chart of FIG. 10 shows the transmission process of the physical blocks assembled by the scheduler 150. A buffer 153 (hereinafter the "current block buffer") is used to store a block in transmission. Connected to this current block buffer 153 is another buffer 152 (hereinafter the "next block buffer") where the next block to be transmitted may be assembled. This double buffer scheme enables the next block to be assembled during the time interval the current block is being transmitted. At the end of the transmission of the current block, the next block is transferred to the current block buffer 153 for transmission and the scheduler 150 can begin to assemble another block in the (now empty) next block buffer 152.

Without any interrupting operations, the scheduler 150 functions to select packets with the highest priority. In the flow chart example of FIG. 10, the highest priority packets are located in the Q1 queue. For each packet selected, the scheduler 150 operates to assemble blocks in the next block buffer 152 together with the appropriate block header and transmit them in sequence through the current block buffer 153. Once the scheduler starts to process a packet in one of the queues Q1, Q2, QN, it must complete the transmission of that packet before selecting a packet from another queue Q1, Q2, QN. This may cause delays in the transmission of other higher priority packets that arrive after the start of transmission of the lower priority packet.

By implementing the interrupting process described above to allow interruption of a packet, the scheduler 150 may begin the transmission of a higher priority packet anytime it begins the assembly of a new block, even if it has already started the transmission of another packet. For the purpose of describing the scheduling process necessary for interrupting packets in accordance with the present invention, a block assembly algorithm by which the scheduler 150 can select packets from the queues Q1, Q2, QN and assemble blocks for transmission in accordance with the invention is described below in reference to FIGS. 11A, 11B, 11C and 11D.

Figure 11A:
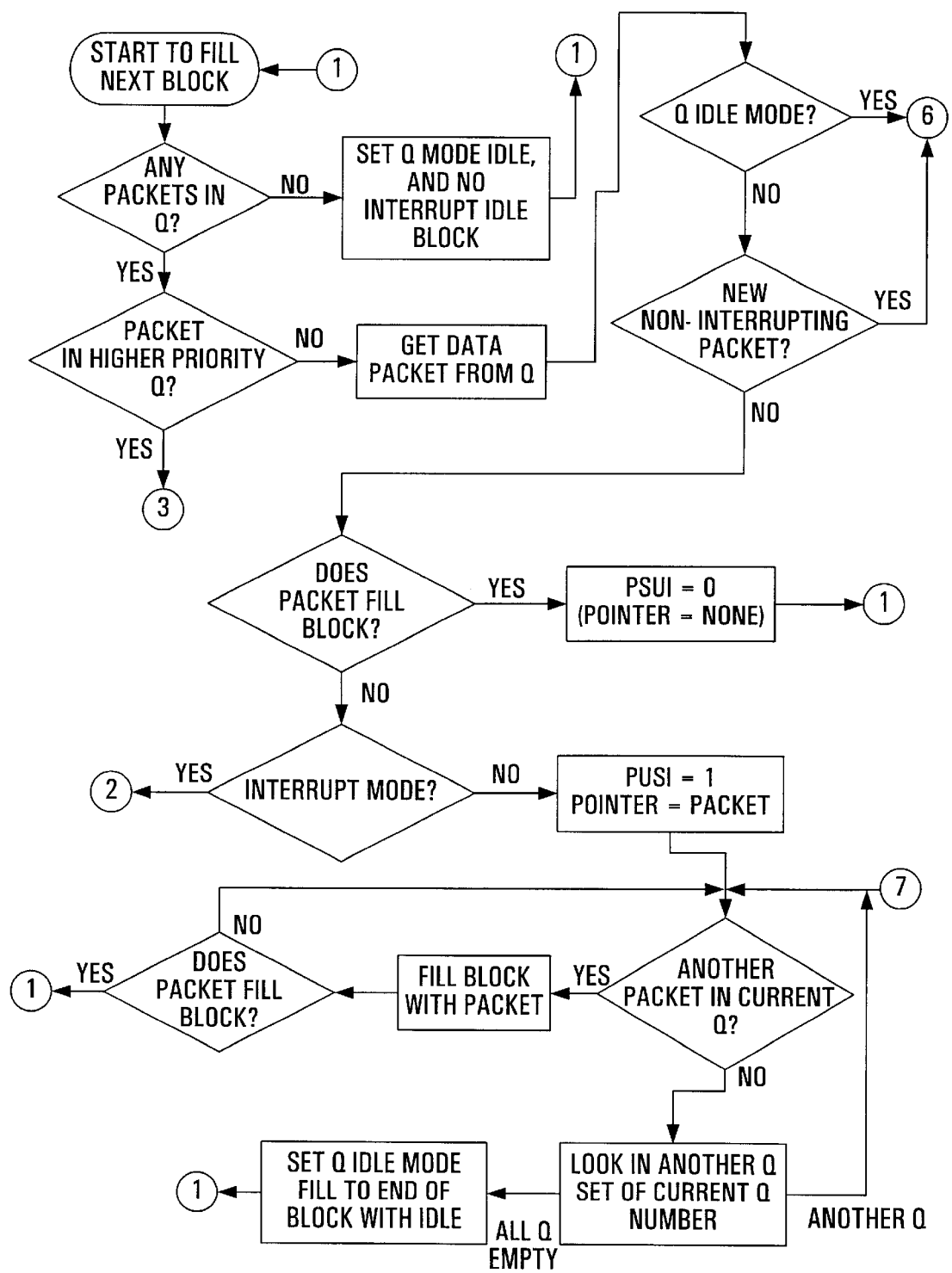
FIG. 11A is a flow chart of a first portion of a block assembly algorithm for packet transmission according to the invention.

This block assembly algorithm is carried out each time a new block is assembled by the scheduler 150 in the next block buffer 152. Referring first to FIG. 11A, there is illustrated a flow chart of a first portion of the block assembly algorithm carried out by the scheduler 150. This particular portion deals with the assembly of blocks with non-interrupting packets stored in the queues Q1, Q2, QN (collectively denoted as "Q" in FIGS. 11A, 11B, 11C and 11D).

The algorithm makes use of two memory elements to keep track of the filling of the next block buffer 152. These elements consist of an interrupt level and a current Q pointer. The interrupt level element is used to denote the number of packet interruption levels. For example, when the interrupt level is zero, it indicates that there are no pending interrupting packets. The current Q pointer is used to denote the queue Q1, Q2, QN of the packet in transmission. The current Q pointer is also used to indicate whether there are any packets awaiting transmission. In particular, when set to zero, the current Q pointer indicates that all the queues. Q1, Q2, QN are empty.

According to the invention, the data packets (or portions thereof) waiting transmission are stored in the queues Q1, Q2, QN until the scheduler 150 begins to fill the next block 152. (see FIG. 10) in accordance with the block assembly algorithm. The block assembly algorithm operated by the scheduler 150 begins at point 1 in the flow chart of FIG. 11A. At that particular point, the algorithm initiates the process of filling the next block buffer 152 with a new block as follows. First, the algorithm checks the current Q pointer to determine whether there are any packets awaiting transmission. If there are none, the algorithm sets the current Q to idle (current Q=zero) and also sets the interrupt level to zero to signal a no-interrupt condition. The algorithm then fills the next block buffer 152 with an idle block and exits back to point 1. These steps are repeated until there is at least one packet in the queues Q1, Q2, QN awaiting to be transmitted.

When an incoming packet is detected, the current Q pointer is set to the queue Q1, Q2, QN in which the incoming packet is located (hereinafter the "current Q"). When it is time to fill another block, the other queues Q1, Q2, QN are then examined by the algorithm to see if there is any other packet in a queue Q1, Q2, QN of a priority higher than that of the current Q. If so, the block assembly algorithm jumps to a further execution point for inserting and transmitting the higher priority packet found. This further execution point is denoted by point 3 on FIG. 11A. The execution of the block assembly algorithm following point 3 is further explained below with reference to FIG. 11D.

If there is no other packet with a higher priority, the algorithm fetches the incoming packet from the queue Q1, Q2, QN designated by the current Q and begins assembling a first block in the next block buffer 152 to initiate transmission of the new packet (see FIG. 10).

The algorithm only fetches from the queue Q1, Q2, QN designated by the current Q as much of the incoming packet as will fit into the next block buffer 152. As data packets received in the queues Q1, Q2, Qn are of varying sizes (lengths), some will be bigger and some smaller than the block size used form transmission. If the incoming packet is too long to fit completely into the next block buffer 152, only a fitting portion will be fetched and the remainder is left in the queue Q1, Q2, Qn to await the next time the algorithm needs to fill the next block buffer 152. If the incoming packet is smaller and does not fill the next block buffer 152, then a following packet from the queue Q1, Q2, QN designated by the current Q or another queue Q1, Q2, QN may be selected to fill the remainder of the block. According to the invention, it is the role of the block assembly algorithm to efficiently select and pack the varying size packets into the next block buffer 152.

The algorithm then proceeds to determine whether the first block in assembly is in fact the first block of the new packet or whether it is instead a continuation block of a packet initiated in a previous block. In order to do this, the algorithm examines the current Q and the interrupt level as follows. If the current Q indicates that the scheduler 150 was previously idle or if the interrupt level is zero at the time the first block is assembled, the block assembly algorithm jumps to a further execution point, point 6 in the algorithm, where the transmission of new non-interrupting packets is handled (the execution of the block assembly algorithm following point 6 is further explained below with reference to FIG. 11B).

If neither of these two conditions is true, the first block in assembly is assumed to be a continuation block of a packet initiated in a previous block. The algorithm then checks to determine whether the new packet fills the first block in assembly. If so, the algorithm completes the assembly of the first block by setting the block header PUSI to zero without any pointer field therefore labeling the block assembled as a continuation block of a packet initiated in a previous block. The assembled block is then forwarded to the current block buffer 153 for transmission and the block assembly algorithm exits to point 1 to proceed with the assembly of another block.

If the new packet does not fill the first block in assembly, then the algorithm will check to see if the scheduler 150 is operating in an interrupt mode (interrupt level≠zero). If the scheduler 150 is operating in an interrupt mode signalling the presence of an interrupting packet, the execution of the block assembly algorithm jumps to a further execution point, point 2 in the algorithm for the transmission of the interrupting packet in the remainder portion of the first block in assembly (the execution of the block assembly algorithm following point 2 is further explained below with reference to FIG. 11C). If the scheduler 150 is not operating in an interrupt mode, no interrupting packet is present and the remainder portion of the first block in assembly can be filled instead with another packet.

In order to signal the presence of a new packet in the first block, the header PUSI bit of the first block is set to one and the block pointer field is set to point to the beginning of the new packet within the first block. Next, a new packet must be found. The algorithm first checks the current Q, and if a waiting packet is found there, it is put in the unused portion of the first block in assembly. This new packet may fill (or overfill) the first block, in which case the block assembly algorithm will exit to point 1 to fill another block. If the new packet does not fill the first block in assembly, the algorithm looks again in the current Q for an awaiting packet. If none are found, the other queues Q1, Q2, QN are checked until a waiting packet is found. If a new packet is found in a particular queue Q1, Q2, QN, the current Q is updated to point to the queue in which the new packet was found and the new packet is loaded in the next block buffer 152 to complete assembly of the first block. If there are no packets waiting, the next block buffer 152 is filled instead with fill characters (as specified by the transmission block format), the current Q flag is set to idle (current Q=zero) to indicate that there are no packets are outstanding and the block assembly algorithm exits back to point 1 to proceed with the assembly of another block.

Figure 11B:
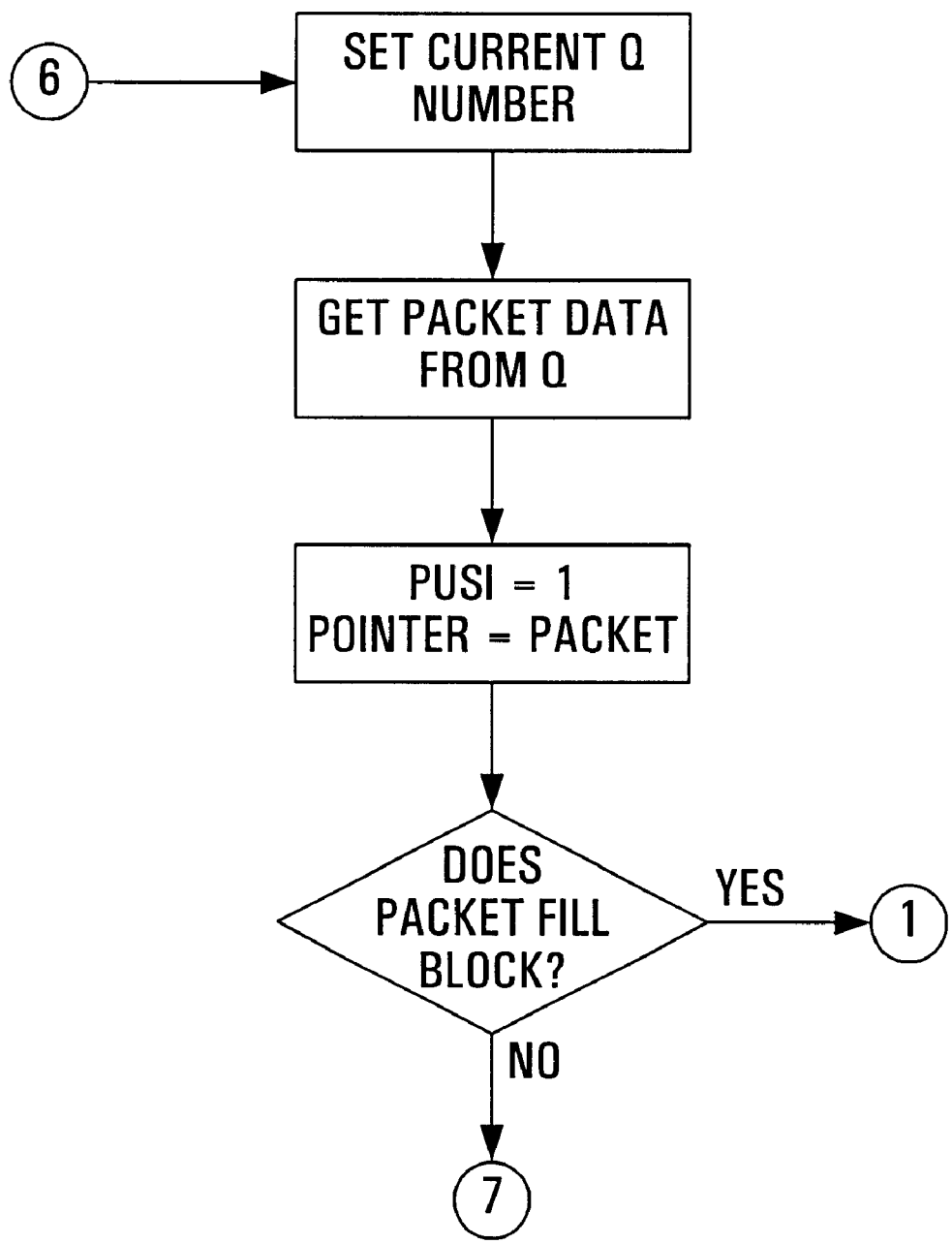
FIG. 11B is a flow chart of a second portion of the block assembly algorithm of FIG. 11A.

Referring now to FIG. 11B, there is illustrated a flow chart of a second portion of the block assembly algorithm carried out by the scheduler 150. This portion of the algorithm deals with the transmission of a new non-interrupting packet starting at point 6 in the block assembly algorithm. It will be recalled that at this particular point, the current Q indicates that the scheduler 150 was previously idle or that the interrupt level is zero at the time the first block is assembled.

When either one of these conditions occurs, the first block in assembly is assumed to be a first block for a new packet and not a continuation block. The algorithm sets the current Q number to the queue Q1, Q2, QN of the new packet. The first block header PUSI bit is set to 1 to indicate the start of the new packet in that block and the pointer field is set to point to the start of the new packet. The algorithm then checks to determine whether the new packet fills the first block in assembly. If the packet fills or overfills the first block, the assembled block is forwarded to the current block buffer 153 for transmission and the block assembly algorithm exits back to point 1 to proceed with the assembly of another block. If the new packet does not fill the first block, the algorithm jumps to point 7 to find another packet or series of packets to fill the lock.

Figure 11C:
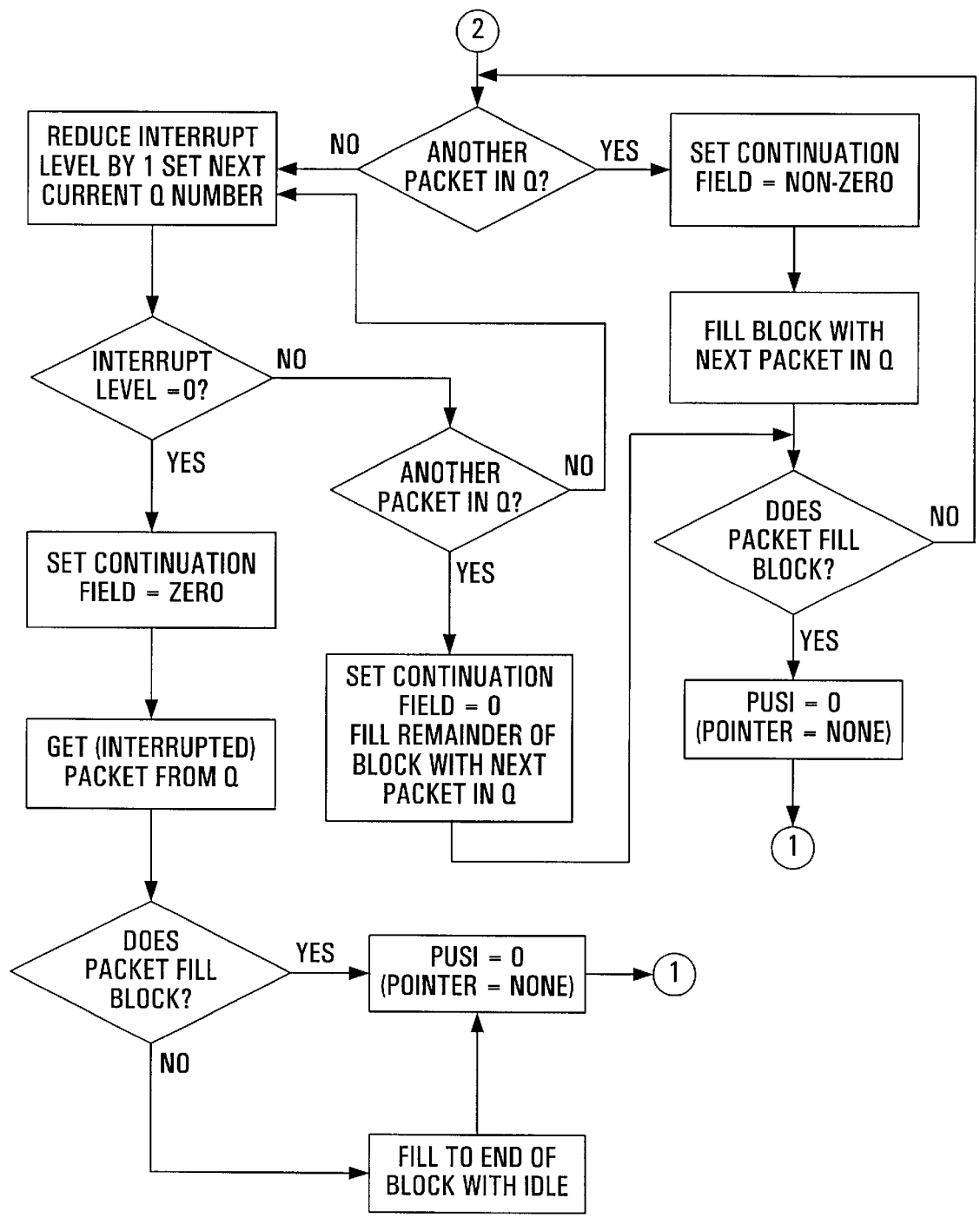
FIG. 11C is a flow chart of a third portion of the block assembly algorithm of FIG. 11A.

The above has outlined the block assembly operation for filling blocks without any interruption. The block assembly operation for filling blocks with interrupting packets will now be described with reference to FIG. 11C and 11D. Referring first to FIG. 11C, there is illustrated a flow chart of a third portion of the block assembly algorithm carried out by the scheduler 150. This particular portion deals with the insertion of an interrupting packet.

At the top of the flow chart, point 2 is shown which, it will be recalled, is the point where the scheduler 150 is operating in an interrupt mode (interrupt≠zero) to signal the presence of interrupting packets in the queues Q1, Q2, QN. At this point, an interrupting packet must be found. The algorithm first checks the current Q. If none are found, the lower priority queues Q1, Q2, QN are checked. This is done by setting the current Q number to the next lower priority and reducing the interrupt level by one.

If as a result, the interrupt level becomes zero, this indicates that there are no more interrupting packets to transmit and that transmission of the interrupted packet should resume. As such, the continuation field of the first block in assembly is set to zero and the assembly of the first block is completed with the interrupted packet. If the interrupted packet fills the first block, the block assembly algorithm exits back to point 1 to initiate the assembly of another block. If the interrupted packet does not fill the first block, the block is completed instead with fill characters. At this point, any awaiting packets must wait until the next block is assembled in order to be transmitted.

If, on reducing the interrupt level by one, the level has not reached zero, this indicates that there may be more interrupted interrupting packets waiting in the queues Q1, Q2, QN. The algorithm thus checks the current Q for awaiting packets and if there are none, reduces the current Q number to check the next queue Q1, Q2, QN. If there are packets in the current Q, the algorithm sets the continuation field to zero to indicate the resumption of an interrupted packet and fills the first block with the next packet in the current Q. If the block is not yet filled, another packet is searched for in the current Q or lower priority queues Q1, Q2, QN.

Referring back to point 2 of the algorithm execution, if a waiting interrupting packet is found in the current Q, it is put in the unused portion of the first block in assembly (see FIG. 11A) and as a result, the algorithm operates to set the continuation field of the first block in assembly to a non-zero value and complete the assembly of the first block with a new interrupting packet. If the interrupting packet fills (or overfills) the first block, the block assembly algorithm exits m back to point 1 after setting the block header PUSI bit of the first block to zero and ensuring that no pointer field is used. If the packet does not fill the first block, the algorithm must find another awaiting packet in a queue Q1, Q2, QN to complete the assembly of the first block and proceed with the assembly of another block.

Figure 11D:
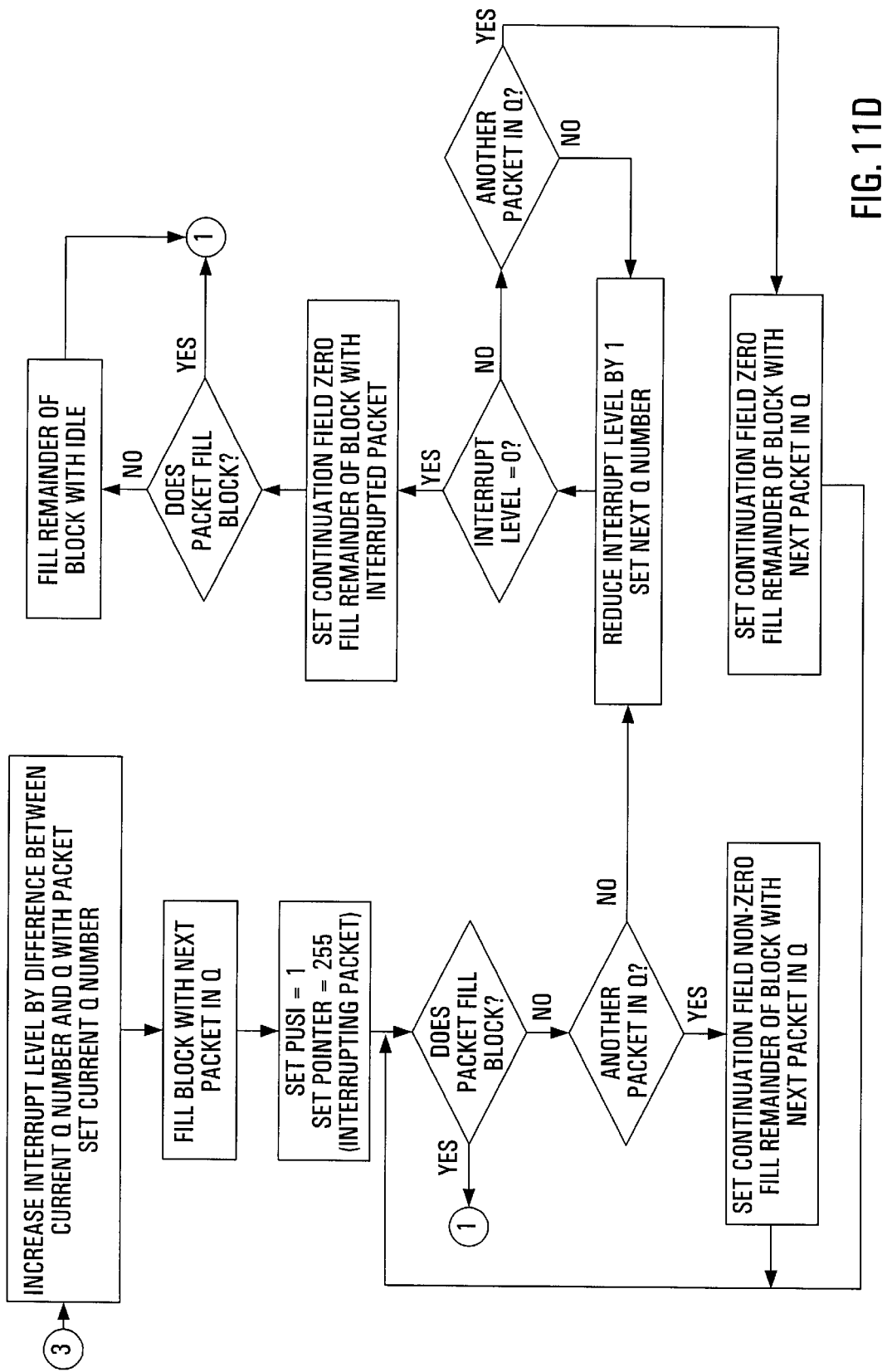
FIG. 11D is a flow chart of a fourth portion of the block assembly algorithm of FIG. 11A.

Referring now to FIG. 11D, there is illustrated a flow chart of a fourth portion of the block assembly algorithm carried out by the scheduler 150. This portion of the algorithm deals with the insertion a new interrupting packet starting at point 3 of the block assembly execution. It will be recalled that at this particular point, an incoming packet is detected in a queue Q1, Q2, QN (the interrupted Q) but another packet of a higher priority is found in another queue Q1, Q2, QN. More specifically, at this particular point, the algorithm is about to fill the first block with a particular packet but has discovered another packet waiting that is in a queue Q1, Q2, QN of a higher priority than the current Q.

As the higher priority packet is detected, the algorithm first sets the interrupt level to a value equal to its current value summed with the difference between the current Q number and the new (higher priority) queue number of the higher priority queue Q1, Q2, QN containing the higher priority packet. The current Q is also updated to point to the higher priority queue Q1, Q2, QN. Once the interrupt level and the current Q numbers are updated to reflect the particular queue Q1, Q2, QN and priority level of the higher priority packet, the first block may be filled with the higher priority packet.

Next, the PUSI bit is set to one to indicate the start of a new packet in the block and the pointer value is set to 255 to indicate that this is an interrupting packet. If the interrupting packet fills (or overfills) the block, then the algorithm continues at point 1 when it is time to again fill a block for transmission.

If the interrupting packet does not fill the block, then the algorithm proceeds to find another packet. If there is a further packet in the current Q, then the continuation field is set to a non-zero value and the remainder portion of the block is filled with the next packet in the current Q. the algorithm then continues by checking if this packet fills the block.

If there are no other packets waiting in the current Q, the algorithm must check the other lower priority queues Q1, Q2, QN. This is done by setting the current Q number to the next lower priority and reducing the interrupt level by one. If as a result, the interrupt level becomes zero, this indicates that there are no more interrupting packets to transmit and that transmission of the interrupted packet may be resumed. For this, the continuation field of the first block in assembly is set to zero to indicate the resumption of the interrupted packet and the assembly of the first block is completed with the interrupted packet. If the interrupted packet fills or overfills the first block, the block assembly algorithm exits back to point 1 to initiate the assembly of another block. If the interrupted packet does not fill the first block, the block is completed instead with fill characters and the algorithm continues at point 1 when it is time to again fill a block for transmission.

If, on reducing the interrupt level by one, the level has not reached zero, this indicates that there may be more interrupted interrupting packets waiting in the queues Q1, Q2, QN. The algorithm thus checks the current Q for awaiting packets and if there are none, checks the next Q1, Q2, QN for awaiting packets. If there are packets in the current Q, the algorithm sets the continuation field to zero to indicate the resumption of an interrupted packet and fills the first block with the next packet in the current Q. If the block is not yet filled, another packet is searched for in the current Q or lower priority queues Q1, Q2, QN.

According to the present invention, the interrupt level is always representative of the priority level at which the scheduler 150 operates. In the example above, the interrupt level is adjusted to denote the priority of the higher priority packet in transmission. With the interrupt level adjusted to reflect the priority of the interrupting packet in transmission, the algorithm can check all of the intervening queues Q1, Q2, QN between the higher priority queue Q1, Q2, QN and the interrupted Q. New (lower priority) interrupting packets may arrive in these queues Q1, Q2, QN during the time the higher priority packet is being transmitted. According to the invention, the algorithm attends to these packets in descending order of priority. After transmitting each of these lower priority packets, the algorithm reduces the interrupt level by one. When the interrupt level reaches zero, the algorithm knows it has returned to the interrupted Q where the interrupted packet is located and, as a result, resumes transmission of the interrupted packet.

While the invention has been described above with reference to a particular network topology, further modifications and improvements to implement the invention in other network configurations which will occur to those skilled in the art, may be made within the purview of the appended claims, without departing from the scope of the invention in its broader aspect.

In particular, the invention has been described above with respect to a communications network. It is understood that the invention could also be applied to other types of networks such as, for example, one using an Internet Protocol which may have different configurations. Further, the invention is not restricted to the DOCSIS packets formatted with the MPEG protocol or the ITU ATM AAL2 I.363.2 format and could also be used in systems which operate with other transmission schemes. Accordingly, the invention could also be used with packets other than DOCSIS packets and physical layer blocks other than MPEG blocks or ATM cells.

The pointer field described above for denoting the presence of interrupting packets in an MPEG block was defined as having a length of one byte and positioned in the physical layer block payload after the block header. It is to be understood that the pointer field could alternatively be defined with a length greater than one byte and placed elsewhere within the block such as, for example, the block header. Further, the pointer field was described as being normally used to denote the location of a new packet within the block payload. It is also to be understood that other existing block fields which have different non-interrupting functions could be used provided they have sufficient unused values for realizing the invention as described therein.

Similarly, the offset field also described above for denoting the presence of interrupting packets in an ATM cell was defined above as having a length of six bits and positioned after the cell header. It is to be understood that the offset field could alternatively be defined with a length greater than six bits and placed elsewhere within the cell such as, for example, the cell header. Further, the offset field was described as being normally used to denote the location of a new packet within the cell payload. It is also to be understood that other existing cell fields which have different non-interrupting functions could be used provided they have sufficient unused values for realizing the invention as described therein.

The continuation field described above in accordance with the present invention was defined as having a length of one byte and positioned in the physical layer block or cell payload after an interrupting packet. It is to be understood that the continuation field could alternatively be defined with a length greater than one byte and placed elsewhere within a block or within a cell and still fall within the purview of the invention.

Further the continuation field has been defined to provide an indication the presence of any further interrupting packets in the data stream. It is to be understood that other means can be used to perform this function such as, for example, unused values of the pointer field which could be set aside for that very purpose.

As an example of an alternative method to permit multiple interrupting packets without the use of a continuation field, the pointer field could be set to 255 to indicate a single interrupting packet. Transmission of the interrupted packet would resume in the first byte following the last byte of the interrupting packet. No continuation packet would be used. If two interrupting packets were to be inserted, the pointer field could be set to 254 to indicate two packets. The general formula for the pointer field could be set to 256 minus the number of interrupting packets to be transmitted. Therefore, the conventionally unused pointer field values in the range of 255 to 184 could be allocated to denote the number of consecutive interrupting packets to be transmitted. With this method, the number of interrupting packets would be limited to 71 to ensure that the pointer field does not fall below 184 and remain in the "invalid" range.

By using the pointer field to denote both the presence and the number of interrupting packets to be transmitted, this technique has the advantage that no continuation fields are needed which, as a result, saves transmission bandwidth. At the receiving end, the receiver would determine the packet boundaries and the resumption of the interrupted packet from the length fields of the interrupting packets. At the transmitting end, the non-use of continuation fields would require the scheduler to know the number of interrupting packets before the pointer field is sent. In situations where new interrupting packets arrive while one or more interrupting packets are being sent, the use of continuation fields is preferred as it would allow the scheduler to insert these further interrupting packets without having to wait until after the interrupted packet is completely transmitted, thus permitting more interruption flexibility.

We claim:

1. A method to interrupt an existing packet in transmission for transmitting an interrupting packet in a communication system where packets are each transmitted in the form of physical layer blocks, the physical layer blocks of each packet containing fields for previously defined purposes and being designed to be consecutively transmitted without interruption, the method comprising:

transmitting one or more physical layer blocks for the existing packet;

before completing the transmission of the existing packet, transmitting at least one physical layer block for the interrupting packet;

denoting the presence of the interrupting packet in the physical layer block for the interrupting packet by using a value or combination of values in one or more existing fields located therein in a manner such that these fields are not used for the defined purposes; and resuming transmission of the existing packet.

2. The method of claim 1 wherein the step of denoting the presence of the interrupting packet comprises:

denoting the presence of a new packet in the physical layer block for the interrupting packet; and denoting the new packet in the physical layer block for the interrupting packet as the interrupting packet.

3. The method of claim 2 wherein denoting the presence of the new packet in the physical layer block for the interrupting packet is done using at least one field of the one or more existing fields thereof.

4. The method of claim 3 wherein the at least one field is located in a header portion of the physical layer block for the interrupting packet.

5. The method of claim 3 wherein denoting the new packet in the physical layer block for the interrupting packet as the interrupting packet is done using at least one other field of the one or more existing fields thereof.

6. The method of claim 5 wherein the at least one other field is located in a payload portion of the physical layer block for the interrupting packet.

7. The method of claim 1 further comprising:

for each new packet which needs to be transmitted, determining whether to treat it as an interrupting packet or to wait until completion of the existing packet.

8. The method of claim 2 wherein the physical layer block for the interrupting packet is a motion picture experts group (MPEG) block.

9. The method of claim 8 wherein a payload unit start indicator (PUSI) field is used for denoting the presence of the new packet in the physical layer block for the interrupting packet.

10. The method of claim 9 wherein for denoting the presence of the new packet in the physical layer block for the interrupting packet, the PUSI field is set to one.

11. The method of claim 10 wherein a pointer field is used for denoting the new packet as the interrupting packet in the physical layer block for the interrupting packet.

12. The method of claim 11 wherein the pointer field is located in a payload portion of the physical layer block for the interrupting packet.

13. The method of claim 12 wherein the defined purpose for the pointer field is to point to a predetermined range in the payload.

14. The method of claim 13 wherein for denoting the new packet as the interrupting packet in the physical layer block for the interrupting packet, the pointer field is set to a value outside of the predetermined range.

15. The method of claim 14 wherein for denoting the new packet as the interrupting packet in the physical layer block for the interrupting packet, the pointer field is set to a value of 255.

16. The method of claim 8 wherein a pointer field is used for denoting the new packet as the interrupting packet in the physical layer block for the interrupting packet.

17. The method of claim 16 wherein the pointer field is located in a payload portion of the physical layer block for the interrupting packet.

18. The method of claim 17 wherein the defined purpose for the pointer field is to point to a predetermined range in the payload.

19. The method of claim 18 wherein for denoting the new packet as the interrupting packet in the physical layer block for the interrupting packet, the pointer field is set to a value outside of the predetermined range.

20. The method of claim 19 wherein for denoting the new packet as the interrupting packet in the physical layer block for the interrupting packet, the pointer field is set to a value of 255.

21. The method of claim 1 wherein denoting the presence of the interrupting packet is done using the at least one field of the one or more existing fields thereof.

22. The method of claim 21 wherein the at least one field is located in a payload portion of the physical layer block for the interrupting packet.

23. The method of claim 22 wherein the physical layer block for the interrupting packet is an asynchronous transfer mode (ATM) adaptation layer 2 (AAL2) block.

24. The method of claim 23 wherein an offset field (OSF) is used for denoting the presence of the interrupting packet.

25. The method of claim 24 wherein the OSF is located in a payload portion of the physical layer block for the interrupting packet.

26. The method of claim 25 wherein the defined purpose for the OSF is to point to a predetermined range in the payload.

27. The method of claim 26 wherein for denoting the presence of the interrupting packet, the OSF is set to a value outside of the predetermined range.

28. The method of claim 27 wherein for denoting the presence of the interrupting packet, the OSF is set to a value of 63.

29. The method of claim 1 wherein the steps of:

before completing the transmission of the existing packet, transmitting at least one physical layer block for the interrupting packet;

denoting the presence of the interrupting packet in the physical layer block for the interrupting packet by using a value or combination of values in one or more existing fields located therein in a manner such that these fields are not used for the defined purposes; and resuming transmission of the existing packet are recursively repeated for nested interruptions.

30. The method of claim 1 further comprising denoting the presence of a second interrupting packet in the physical layer block for the first interrupting packet by using one or more other existing fields located therein.

31. The method of claim 30 wherein a continuation field is used for denoting the presence of the second interrupting packet.

32. The method of claim 31 wherein the continuation field is located in a payload portion of the physical layer block for the first interrupting packet after the first interrupting packet.

33. The method of claim 32 wherein for denoting the presence of the second interrupting packet in the physical layer block for the first interrupting packet, the continuation field is set to a non-zero value.

34. The method of claim 33 wherein the continuation field is set according to the number of interrupting packets which remain to be transmitted.

35. The method of claim 34 wherein for resuming transmission of the existing packet in the physical layer block for the first interrupting packet, the continuation field is set to zero.

36. A scheduler for interrupting an existing packet in transmission for transmitting an interrupting packet in a communication system where packets are each transmitted in the form of physical layer blocks, the physical layer blocks of each packet containing fields for previously defined purposes and being designed to be consecutively transmitted without interruption, the scheduler being connected for receiving packets which require transmission and comprising:

means for transmitting one or more physical layer blocks for the existing packet;

means for transmitting at least one physical layer block for the interrupting packet before completing the transmission of the existing packet;

means for denoting the presence of the interrupting packet in the physical layer block for the interrupting packet by using a value or combination of values in one or more existing fields located therein in a manner such that these fields are not used for the defined purposes; and means for resuming transmission of the existing packet;

wherein the scheduler is operable to determine for each packet received whether to treat it as an interrupting packet or to wait until completion of an existing packet.

37. The scheduler of claim 36 wherein the scheduler receives packets from a plurality of queues, each queue being associated with a particular transmission priority.

38. The scheduler of claim 37 wherein for determining whether to treat a packet received as an interrupting packet, the scheduler relies on the transmission priority associated with a queue containing the packet.

39. The scheduler of claim 36 also being operable to assemble physical layer blocks based on the packets received for transmission.

40. The scheduler of claim 39 further connected to a block header unit for obtaining proper header information for each physical layer block assembled.

41. The scheduler of claim 40 wherein for assembling physical layer blocks, the scheduler is further connected to a first buffer.

42. The scheduler of claim 41 wherein the first buffer is connected to a second buffer for storing each physical layer block assembled during transmission.

\* \* \* \* \*